United States Patent
Sakoda et al.

(10) Patent No.: US 6,351,461 B1
(45) Date of Patent: *Feb. 26, 2002

(54) COMMUNICATION METHOD, BASE STATION AND TERMINAL APPARATUS

(75) Inventors: Kazuyuki Sakoda, Tokyo; Mitsuhiro Suzuki, Chiba, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,391

(22) Filed: Dec. 24, 1997

(30) Foreign Application Priority Data

Dec. 26, 1996 (JP) .............................. 8-348802

(51) Int. Cl.[7] .............................. H04B 7/216; H04J 3/16
(52) U.S. Cl. ........................ 370/335; 370/342; 370/468
(58) Field of Search ................................ 370/330, 335, 370/337, 468, 478, 481, 336, 342, 345, 319, 321, 328, 329, 436, 498

(56) References Cited

U.S. PATENT DOCUMENTS

| 5,128,959 | A | | 7/1992 | Bruckert ........................ 375/1 |
|---|---|---|---|---|
| 5,515,379 | A | | 5/1996 | Crisler et al. ............... 370/95.3 |
| 5,535,207 | A | | 7/1996 | Dupont ......................... 370/80 |
| 5,541,552 | A | | 7/1996 | Suzuki et al. |
| 5,583,869 | A | | 12/1996 | Grube et al. ................. 370/347 |
| 5,621,723 | A | * | 4/1997 | Walton, Jr. et al. ......... 370/335 |
| 5,694,415 | A | | 12/1997 | Suzuki et al. |
| 5,915,212 | A | * | 6/1999 | Przelomiec et al. .......... 455/83 |
| 6,018,528 | A | * | 1/2000 | Gitlin et al. ................. 370/436 |
| 6,049,551 | A | * | 4/2000 | Hinderks et al. ........... 370/468 |
| 6,069,883 | A | * | 5/2000 | Ejzak et al. ................. 370/335 |
| 6,072,787 | A | * | 6/2000 | Hamalanien et al. ....... 370/335 |

FOREIGN PATENT DOCUMENTS

EP 0726690 8/1996 ............ H04Q/7/38

* cited by examiner

*Primary Examiner*—Alpus H. Hsu
*Assistant Examiner*—Afsar M. Qureshi
(74) *Attorney, Agent, or Firm*—Jay H. Maioli

(57) ABSTRACT

A communication resource allocation method is one in which a second apparatus allocates a communication resource based on a request from a first apparatus, and includes an allocation request step for transmitting an allocation request signal by the first apparatus to the second apparatus, and a resource allocation step for detecting, by the second apparatus, the allocation request signal to allocate a communication resource. The communication resource allocation is carried out by using a resource of a predetermined amount as a unit.

22 Claims, 15 Drawing Sheets

COMMUNICATION METHOD, BASE STATION AND TERMINAL APPARATUS

BACKGROUND OF THE INVENTION

1. Field of the Invention

The present invention relates to a method of communication suitable for use in, for example, a base station and a terminal apparatus in a radio telephone system, and a base station and a terminal apparatus to which the method of communication is applied.

2. Description of the Related Art

In a mobile communication such as a radio telephone system or the like, multiple access is provided in which a plurality of base stations are provided at a predetermined interval to form a service area and each of the base stations is connected to a plurality of mobile stations (terminal apparatus). In this case, a predetermined transmission band is allocated in advance to each base station; a plurality of transmission channels are set in the transmission band; in the case of a request for communication or the like from each terminal apparatus, any of the transmission channels is allocated to the terminal apparatus; and the terminal apparatus side initiates communication by way of the base station using the allocated transmission channel.

For example, such systems of communication wherein the transmission channels are set include a frequency division multiple access (FDMA), a time division multiple access (TDMA), a code division multiple access (CDMA) and so on.

Referring to each method, the communication system of FDMA system is one in which a plurality of transmission channels are provided by dividing the transmission band prepared by a unit of frequency. The communication system of TDMA system is one in which a transmission channel is divided by a predetermined time unit to form a plurality of time slots within a single transmission channel, each of the time slots being allocated to the terminal equipments to be linked. Therefore, it is possible to link the plurality of terminal equipment using the single transmission channel. The communication system of CDMA system is one in which a specified code is allocated to each of the terminal equipments and a carrier having the same frequency is subjected to spectrum spread modulation by the code for transmitting it to the base station. The receiving side achieves synchronization with each code to identify a signal from a desired terminal apparatus.

In a radio telephone system, even if any of the above systems is employed and a transmission channel is set in accordance therewith, a transmission capacity of data which can be transmitted on one transmission channel is previously determined and hence the transmission capacity cannot be changed depending upon the kind of transmission data. In a general radio telephone system, the transmission capacity of one transmission channel is set so as to be a capacity which allows transmission of audio data for speech.

Recently, while attempts to transmit various data other than audio data by using a radio terminal such as a portable telephone or the like has been made, such a limitation that data of only a predetermined transmission capacity can be transmitted on one transmission channel brings the disadvantage that it takes considerable time to transmit data of a large capacity. In order to solve this problem, it may be sufficient to set a large transmission capacity as the transmission capacity of data which can be transmitted on one channel. However, as the transmission capacity of one channel is increased, a frequency band width of one transmission channel and so on must be set wide to that extent, which consequently reduces the number of transmission channels set in a transmission band allocated to one base station. Moreover, if data of a comparatively small capacity such as audio data is transmitted, the data amount to be transmitted on each of the transmission channels becomes smaller as compared with the transmission capacity of the transmission channel, which disadvantageously causes an ineffective use of the transmission band.

SUMMARY OF THE INVENTION

In view of such aspects, it is an object of the present invention to correctly carry out a radio communication such as a radio telephone system or the like even if a transmission capacity is changed.

According to a first aspect of the present invention, a communication resource allocation method in which a second apparatus allocates a communication resource based on a request from a first apparatus includes an allocation request step for transmitting an allocation request signal by the first apparatus to the second apparatus, and a resource allocation step for detecting, by the second apparatus, the allocation request signal to allocate a communication resource. The communication resource allocation is carried out by using a resource of a predetermined amount as a unit.

According to a second aspect of the present invention, a communication resource allocation method in which a second apparatus allocates a communication resource based on a request from a first apparatus includes an allocation request step for transmitting an allocation request signal by the first apparatus to the second apparatus, an acceptance step for detecting the allocation request signal by the second apparatus to transmit a related information to the first apparatus therefrom, a confirmation step for receiving the related information by the second apparatus to transmit an acknowledge signal therefrom for confirmation, and an information transmission step for, after confirmation step, carrying out a communication by the first and second apparatus based on a communication resource allocation made by employing a resource of a predetermined amount included in the related information as a unit.

According to a third aspect of the present invention, a base station for allocating a communication resource based on a request from a terminal includes a reception unit for receiving an allocation request signal from the terminal, a control unit for grasping a condition of a communication resource and for carrying out a communication resource allocation at a unit of a resource of a predetermined amount in response to the allocation request signal, and a transmission unit for transmitting a result of the communication resource allocation by the control unit.

According to a fourth aspect of the present invention, a terminal apparatus includes a control unit for generating an allocation request signal, a transmission unit for transmitting the allocation request signal generated by the control unit, and a reception unit for receiving a result of a communication resource allocation carried out by a base station. The control unit controls communication based on the received result of the communication resource allocation and the communication resource allocation is carried out by using a resource of a predetermined amount as a unit.

DESCRIPTION OF THE PREFERRED EMBODIMENTS

A first embodiment according to the present invention will hereinafter be described with reference to FIGS. 1 to 5.

In the first embodiment, the present invention is applied to a radio telephone system to which a TDMA system is applied. The radio telephone system is a system of a cellular system in which a base station is located at a predetermined interval and thereby a communication area is set.

Figure 1:
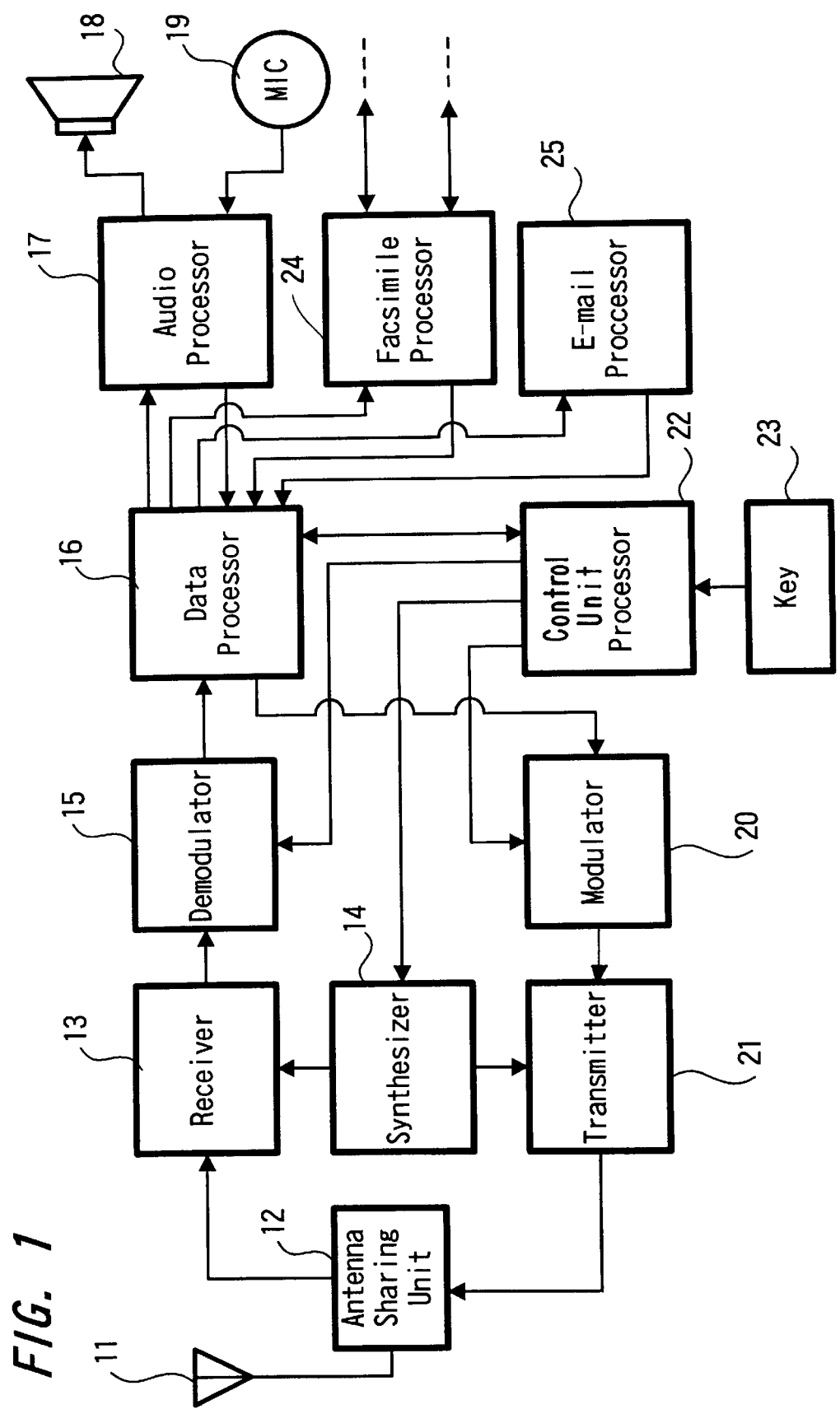
FIG. 1 is a block diagram showing an arrangement of a terminal apparatus according to a first embodiment of the present invention.

FIG. 1 is a diagram showing a configuration of a terminal apparatus used in the radio telephone system. Referring first to the configuration of a reception system, an antenna 11 is connected to a reception unit 13 through an antenna sharing device 12, and an output frequency signal from a frequency synthesizer 14 constituted by a PLL circuit or the like is supplied to the reception unit 13. The output frequency signal from the frequency synthesizer 14 is mixed with a reception signal supplied from the antenna 11 to the reception unit 13 to frequency convert on the reception signal at a predetermined frequency into an intermediate frequency signal. In this case, the output frequency of the frequency synthesizer 14 is determined based on the control of a control unit 22 which is a system controller for controlling the communication operation of this terminal apparatus.

The reception signal which has been converted into an intermediate frequency signal is supplied to a demodulation unit 15 where it is subjected to a demodulation process based on a specified communication system to be converted into a reception data which is a symbol string. The reception data which is a demodulated symbol string is supplied to a data processing unit 16 which extracts required data and supplies the same to corresponding signal processing units.

For example, audio data included in the reception data is supplied to an audio processing unit 17, converted into an analog audio signal by an audio process in the audio processing unit 17, and emitted as sounds from a speaker 18 connected thereto. Facsimile data included in the reception data is supplied to a facsimile processing unit 24 and is converted by this facsimile processing unit 24 into data to be supplied to a facsimile apparatus (not shown). Further, electronic mail data included in the reception data is supplied to an electronic mail processing unit 25 and is converted by this electronic mail processing unit 25 into data to be supplied to an electronic mail receiving apparatus (such as a personal computer apparatus, personal digital assistant or the like which is not shown). Control data included in the reception data is supplied to the control unit 22 which executes the corresponding communication control. Those reception data types are determined from the control data or the like included in the reception data.

Referring next to a transmission system of the terminal apparatus, for example, in the case of audio data, an audio signal picked up by a microphone 19 connected to the audio processing unit 17 is converted by the audio processing unit 17 into digital audio data for transmission, and this audio data is supplied to a TDMA processing unit 16 and is located at a predetermined position in a symbol string to be transmitted. At the other positions in the symbol string to be transmitted, a predetermined synchronization pattern, control data supplied from the control unit 22 and the like are located.

The transmission data which is a symbol string output from the TDMA processing unit 16 is supplied to a modulation unit 20 to perform a modulation process for transmission, and the modulated signal is supplied to a transmission unit 21 where it is mixed with a frequency signal output by the frequency synthesizer 14 to be frequency-converted into a predetermined transmission frequency. A transmission signal at this transmission frequency is supplied through the antenna sharing device 12 to the antenna 11 to be transmitted on a wireless basis.

A facsimile signal transmitted from a facsimile apparatus (or a computer apparatus to which a modem for facsimile communication is connected) which is not shown to the facsimile processing unit 24 is converted by the facsimile processing unit 24 into facsimile data, and the facsimile data is supplied to the TDMA processing unit 16 where it is subjected to a transmission process similar to that in the case of audio data as described above. Further, electronic mail data for transmission supplied from an apparatus for transmitting and receiving an electronic mail which is not shown to the electronic mail processing unit 25 is converted by the electronic mail processing unit 25 into electronic mail data to be transmitted, and the electronic mail data is supplied to the TDMA processing unit 16 where it is subjected to a transmission process similar to that in the case of audio data as described above.

Various keys 23 are connected to the control unit 22, and operations such as transmission and reception and so on are performed with the keys 23. Further, the terminal apparatus in the present embodiment has a capability of performing a communication process on a plurality of transmission channels simultaneously, and a transmission channel is set under the control of the control unit 22. The process of setting a plurality of transmission channels simultaneously will be described later on.

Figure 2:
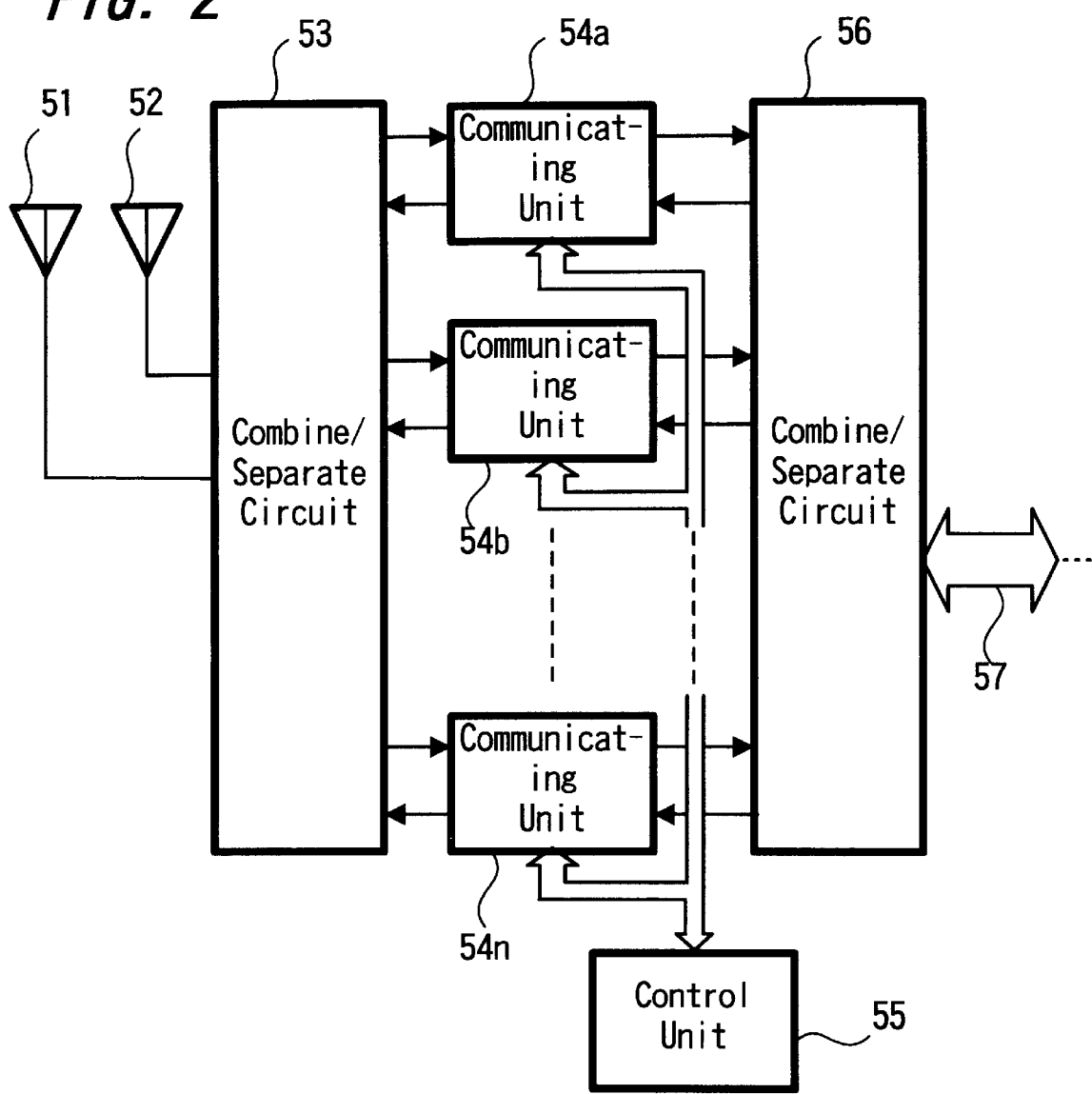
FIG. 2 is a block diagram showing an arrangement of a base station according to the first embodiment.

A configuration of a base station which communicates with the terminal apparatus will now be described with reference to FIG. 2. Although the base station has a basic configuration for a communication process which is similar to that of the terminal apparatus an arrangement, which communicates with a plurality of terminal apparatuses, is different from the terminal apparatus. Specifically, antenna systems 51, 52 of two systems are connected to a synthesis/separation circuit 53, and reception signals are separated by the synthesis/separation circuit 53 at every transmission channel or the like to separate reception signals from each terminal apparatus into signals of a plurality of systems for each of one or a plurality of terminal apparatuses. The reception signals in the respective separated systems are supplied to respective different communication units 54a, 54b, . . . , 54n (n is an arbitrary number) to be subjected to a reception process and a demodulation process. The demodulated reception data is subjected to a transmission process for transmitting it to an exclusive line 57 connected to a communication control station which coordinates base stations, and the processed signal is transmitted to the exclusive line 57 through a synthesis/separation circuit 56.

Further, a signal transmitted from the exclusive line 57 to the base station is separated by the synthesis/separation circuit 56 into signals in a plurality of systems. The separated signals in respective systems are supplied to respective different communication units 54a, 54b, . . . , 54n, and a modulation process and a transmission process for transmission to the terminal apparatuses are performed after a process of receiving from the exclusive line 57 to supply the signals to either of the antennas 51, 52 through the synthesis/separation circuit 53 for transmission on a wireless basis.

The processes of transmission and reception at each of the communication units 54a–54n of the base station are performed under control of a control unit 55, and the addition and discrimination of necessary control data or the like are also carried out under control of the control unit 55.

Communication conditions for communications performed between the terminal apparatus and base station described above will now be described. In the embodiment, a transmission capacity for communication between the terminal apparatus and the base station can be adaptively set. The process of setting the transmission capacity adaptively will be described referring to a case wherein the TDMA system (time division multiple access system) is used as the system for communication between the terminal apparatus and base station. In this case, a transmission frequency of an up-link circuit from the terminal apparatus to the base station and a transmission frequency of a down-link circuit from the base station to the terminal apparatus are set different from each other, and thus a communication circuit between the terminal apparatus and the base station is set.

Figure 3:
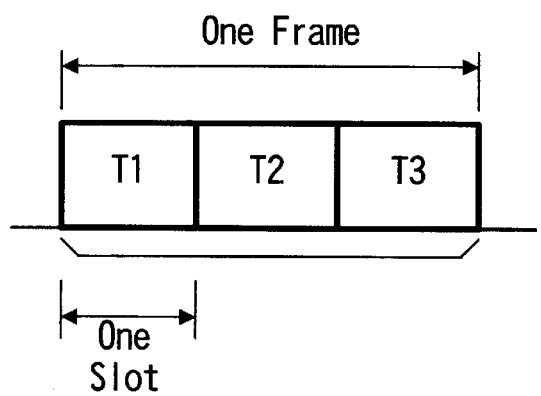
FIG. 3 is a diagram used to explain a frame configuration according to the first embodiment by way of example.

In the TDMA system, one transmission band is divided by a predetermined time unit, and thereby a multiple access permitting simultaneous use of one transmission band by a plurality of terminal apparatus is carried out. Specifically, if one transmission band is divided into three, then, as shown in FIG. 3, one frame is defined by a predetermined time unit and this frame configuration is repeated. It is assumed that three parts into which one frame is divided are time slots T1, T2 and T3. One time slot has a time ranging substantially from several hundred μsec. to several msec., and each of the time slots T1, T2, T3 generally has the same time interval. However, it may have different time intervals in order to change an information amount which can be transmitted in each of the time slots. A burst signal during each of the time slot intervals is intermittently transmitted and received between the terminal apparatus and the base station.

Figure 4A:
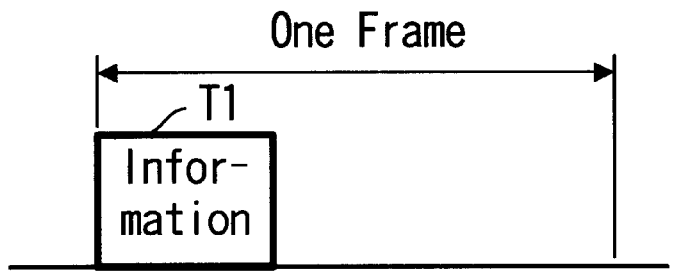
FIGS. 4A to 4E are diagrams used to explain a communication processing according to the first embodiment.

In this embodiment, each of the transmission channels (transmission frequencies) in the transmission band for the up-link circuit and each of the transmission channels (transmission frequencies) in the transmission band for the down-link circuit has the frame configuration of the same timing shown in FIG. 3. For example, it is assumed that as shown in FIG. 4A, a communication circuit using the time slot T1 of each frame is set between a certain terminal apparatus and the base station and then a bidirectional communication for transmitting a predetermined information (audio data, facsimile data, electronic mail data and so on) is carried out. In the following description, a time slot in each frame is used in both of the up-link circuit and the down-link circuit in the same state if not specially indicated. This frame configuration is that for a so-called information channel used for transmission of information such as the audio data or the like. A control channel used for transmission of a control data used for control of call-out and call-in is set independently of the information channel. A part of the information channel is sometimes used as a control channel.

It is assumed that while the communication circuit using the time slot T1 is set in this configuration, a request to increase the transmission capacity of the information to be transmitted (i.e., a request to increase a transmission speed) is issued. At this time, if there is any free slot in the same transmission frequency, this free slot is added and allocated to this communication circuit. This request is made by using the control channel.

Figure 5:
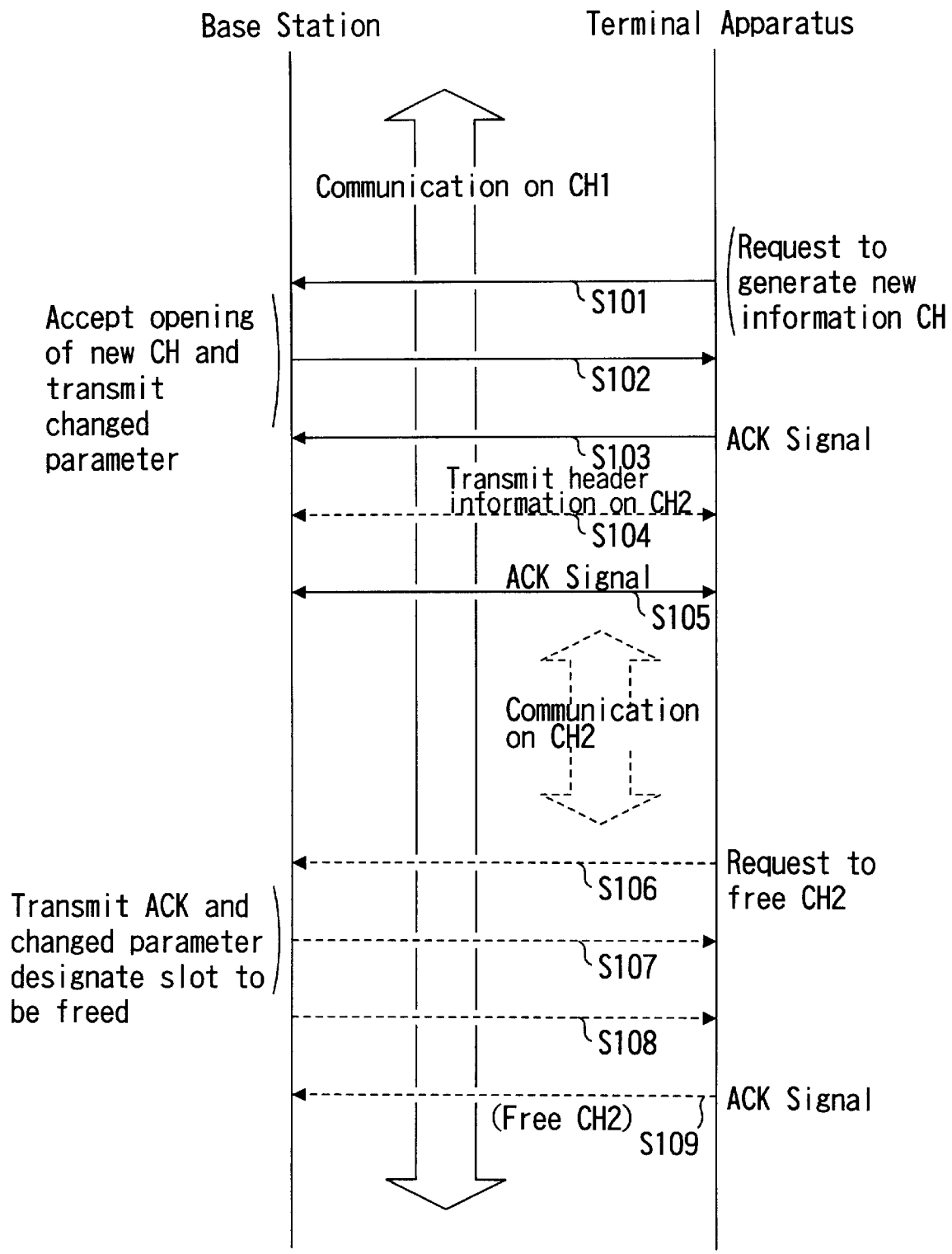
FIG. 5 is a diagram used to explain a connection sequence of a communication according to embodiments of the present invention.

FIG. 5 is a diagram showing a connection sequence in the above case. In FIG. 5, a communication on a channel 1 (CH1) is a communication continuously carried out with the time slot T1 used (communication shown by a solid line in FIG. 5), and a communication on a channel 2 (CH2) is a newly added communication using the time slot T2 (communication shown by a broken line in FIG. 5). It is initially assumed that while the communication on the channel 1 using the time slot T1 is carried out, increase of the transmission capacity is demanded to start transmission of new information from the terminal apparatus. At this time, the terminal apparatus transmits a request signal S101 for requesting generation of a new information channel to the base station by using a predetermined period in the time slot T2 of the up-link circuit which is being used for communication.

When receiving the request signal S101 for requesting generation of the new information channel, the base station detects a free slot in the same transmission frequency and transmits a signal indicative of acceptance of opening a new channel in the free slot and a signal S102 indicative of parameters changed in accordance with the acceptance. The signal S102 is transmitted by using a predetermined period in the time slot T1 (channel 1) of the down-link circuit which is being used for communication. When receiving and confirming the signal indicative of the acceptance and so on, the terminal apparatus transmits an acknowledge (ACK) signal S103 by using the time slot T1 of the up-link circuit.

Figure 4B:
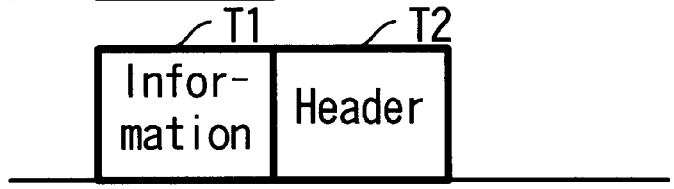

The parameters transmitted from the base station include not only data of the number (in this case, the slot T2) of a slot allocated as a new channel but also data of a timing at which communication is started in the slot. At the timing indicated by the data, the base station starts transmitting a header information signal by using the newly allocated time slot T2 of the down-link circuit, and the terminal apparatus starts transmitting a header information signal by using the newly allocated time slot T2 of the up-link circuit (these processings are indicated by reference number S104 in FIG. 5). Accordingly, as shown in FIG. 4B, while the information such as the audio data or the like is continuously transmitted by using the slot T1 in each of frames, the transmission of the header information signal is started by using the time slot T2. The header information signal is a predetermined signal formed of data having a specific pattern.

Figure 4C:
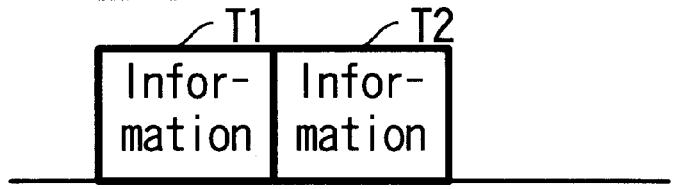

When the bidirectional transmission S104 of the header information signal by using the newly allocated time slot T2 is started, a reception-side control unit determines whether the header information signal can be correctly received. If it is determined that the header information signal is received correctly, the reception-side control unit transmits an acknowledge signal S105 to the transmission side by using a predetermined period in the time slot T1. When both sides receives and discriminates the acknowledge signals S105, the transmission of the information by using the newly allocated time slot T2, and a communication circuit between the base station and one terminal apparatus is set in a state as shown in FIG. 4C. When information is transmitted by using the time slots T1 and T2, information of the same kind may be transmitted by being divided into two for the two time slots T1 and T2 or informations of different kinds (e.g., an audio data and an electronic mail data) may be transmitted by using the time slots T1 and T2, respectively.

The process of changing a transmission capacity to the original transmission capacity (the process of reducing a transmission capacity when a transmission circuit using two time slots is initially set) will be described. When the transmission capacity is reduced in accordance with the request from the terminal apparatus, as shown in FIG. 5, the terminal apparatus transmits a request signal S106 used for requesting the base station to open the time slot T2 to the base station by using the time slot T2 (channel 2) in the up-link circuit. When the base station receives the opening request signal S106 and its control unit confirms it, the base station transmits an acknowledge signal and a signal S107 indicative of parameters to be changed to the terminal apparatus by using the time slot T2 of the down-link circuit. After transmitting the signal S107 indicative of the parameters to be changed, the base station transmits a signal S108 for designating the number of a slot to be freed to the terminal apparatus as a trailer information signal used for freeing the circuit by using the time slot T2 of the down-link circuit. When the terminal apparatus receives the signal S108 and its control unit confirms it, the terminal apparatus transmits an acknowledge signal (ACK signal) S109 to the base station by using the time slot T2 of the up-link circuit and terminates the communication using the time slot T2, thereby freeing the communication circuit using the time slot T2 (channel 2). Thereafter, only the communication circuit using the time slot T1 is still carried out, and hence the communication circuit is set in a state shown in FIG. 4A.

Figure 4D:
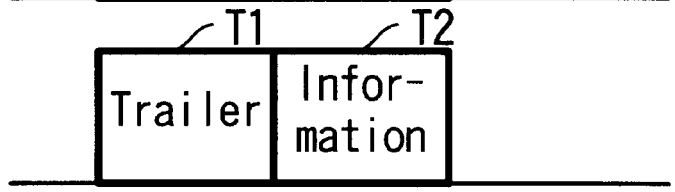
Figure 4E:
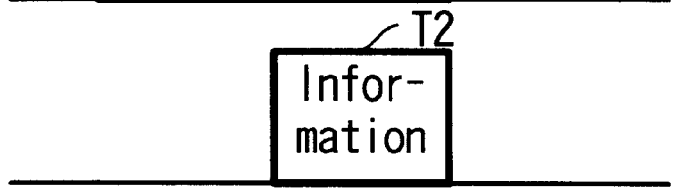

An initially set slot may be freed with added slots remaining instead of freeing the added slot as described above. For example, as shown in FIG. 4C, in a state that the slots T1, T2 are used as the information transmission channels, the transmission of information in the slot T1 is stopped, and a trailer information signal as a circuit freeing information is transmitted in the slot T1 as shown in FIG. 4D. As shown in FIG. 4E, the communication circuit using the slot T1 is freed, and only the communication circuit using the slot T2 is kept. In this case, the processings from transmission of the freeing request signal S106 to transmission of the ACK signal S109 described with reference to FIG. 5 are carried out by using the communication circuit using the slot T1.

If the capacity of information which can be transmitted in the slot T1 and the capacity of information which can be transmitted in the slot T2 are different from each other, then the original slot may be freed immediately after the slot is added. Specifically, it is assumed that the transmission capacity in the slot T2 is larger than the transmission capacity in the slot T1 and a request to increase the transmission capacity is issued in a state the communication circuit using the slot T1 is set (a state shown in FIG. 4A). At this time, the header information and so on are transmitted in the slot T2 as shown in FIG. 4B, and the processing for adding the slot T2 is carried out. The transmission of the information in the slot T2 is started, and at the same time the trailer information for freeing the slot T1 is transmitted as shown in FIG. 4D. The slot T1 is freed as shown in FIG. 4E. Thereafter, the information may be transmitted only in the slot T2. This arrangement allows the transmission capacity to be increased and decreased by changing the transmission slot.

When the above TDMA communication is carried out, a processing called frequency hopping for changing a transmission frequency at every predetermined interval may be carried out. In this frequency hopping processing, the base station and the terminal apparatus carry out a processing for changing a transmission frequency at every one frame period or every several frame period based on a command from the base station in synchronization with each other. This frequency hopping allows the transmission signal to be substantially uniformly spread in the transmission band prepared for every base station and also can increase the resistance to radio interference and noises. When the frequency hopping is applied to a system which permits the slot number to be increased or decreased as carried out in this embodiment, if a request is sent to increase the number of slots from a certain terminal apparatus, then a transmission frequency of a communication circuit to other terminal apparatus is set so that a slot continued from the slot of the channel under use for communication with the terminal apparatus should become a free slot, and then the frequency hopping is carried out. Then, it is possible to easily realize the addition of the slots without any interfering with other communication circuits.

While in this embodiment the number of slots of the up-link and down-link circuits are increased and decreased, only the number of slots of either of the circuits may be increased or decreased. While this embodiment employs a system in which different transmission frequencies are used for the up-link circuit and the down-link circuit, it is needless to say that the present invention can be applied to a system in which the same transmission frequency is allocated to the slot of the up-link circuit and the slot of the down-link circuit in a time division fashion.

A second embodiment will be described with reference to FIGS. 6 to 16.

In this embodiment, the present invention is applied to a radio telephone system of a cellular system according to a multicarrier transmission system. The multicarrier transmission system will be described in detail with reference to FIGS. 6 to 8. A communication system according to this embodiment is arranged as a so-called multicarrier system in which a plurality of subcarriers are continuously disposed within a band allocated in advance, and the plurality of subcarriers within the single band are utilized on a single transmission path at the same time. Further, the plurality of subcarriers within the single band are collectively divided in the band to be modulated.

Figure 6:
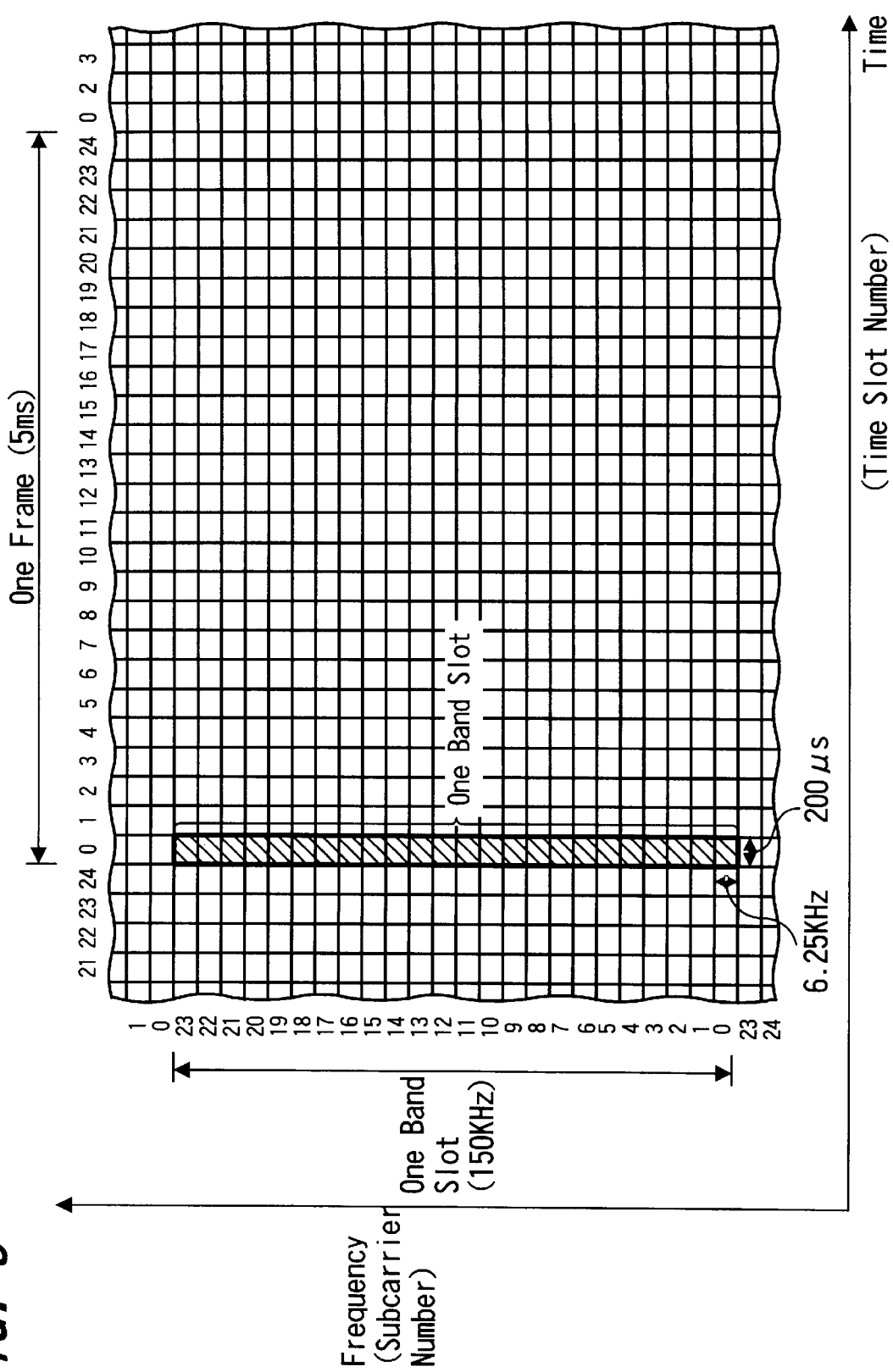
FIG. 6 is a diagram used to explain a slot arrangement of a communication system applied to a second embodiment of the present invention.
Figure 7:
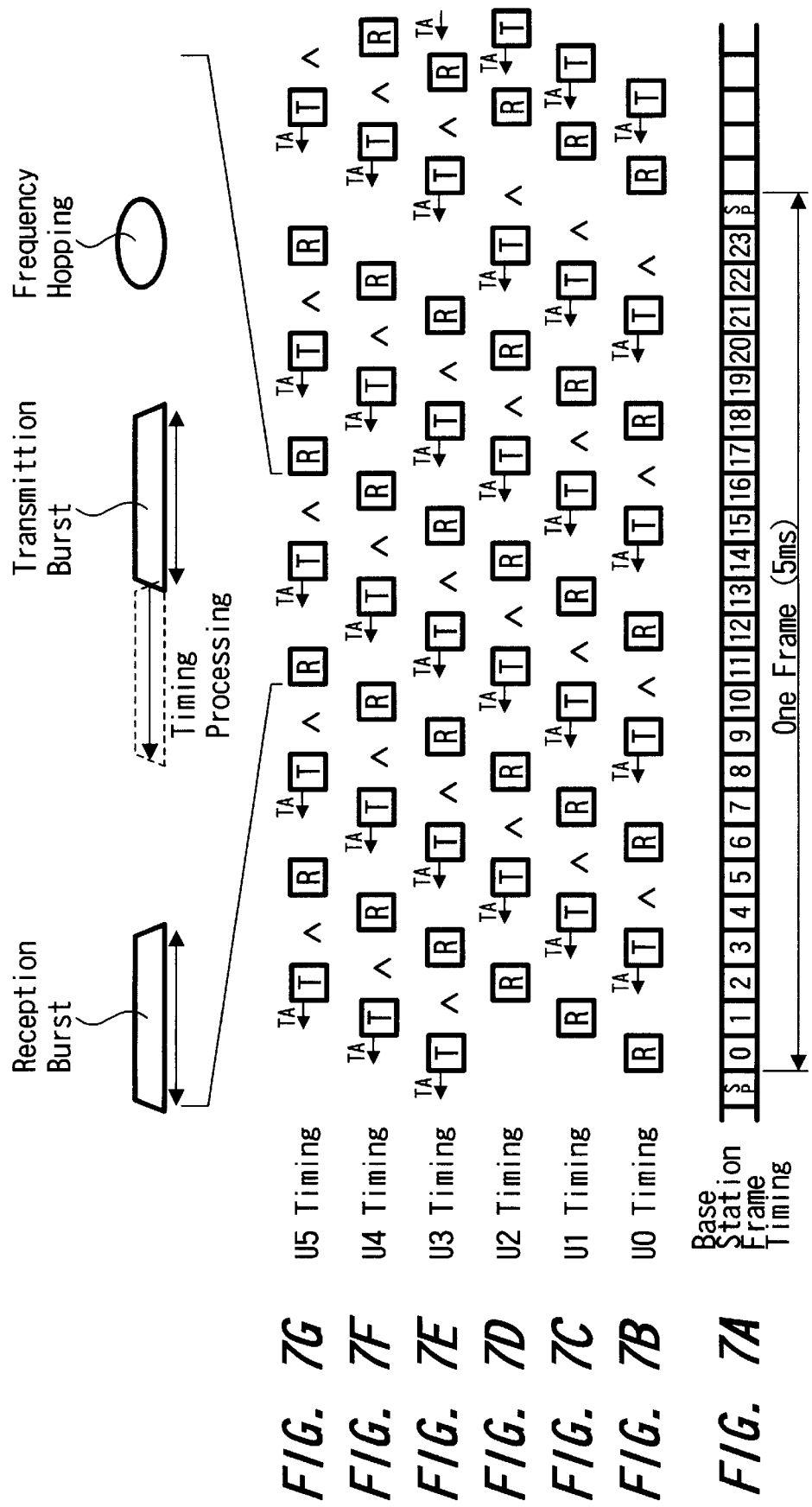
FIGS. 7A to 7G are diagrams used to explain a transmission timing of the communication system applied to the second embodiment.
Figure 8:
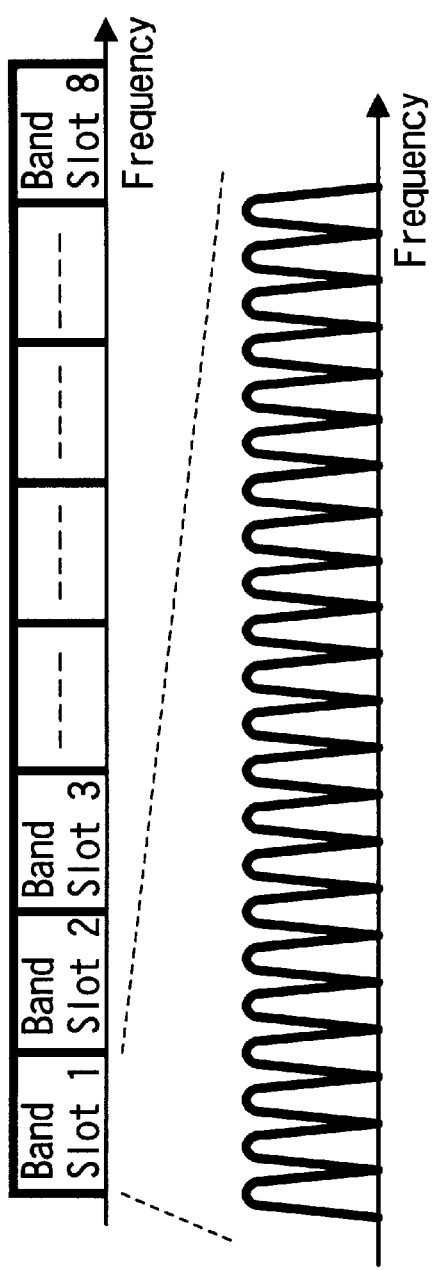
FIGS. 8A to 8B are diagrams used and explain a band slot of the communication system applied to the second embodiment.

The arrangement thereof will be described below. FIG. 6 is a diagram showing a slot arrangement of transmission signals of the present embodiment in which a frequency is set in the ordinate thereof and a time is expressed on the abscissa thereof. In the present example, the frequency-axis and the time-axis are divided in a lattice fashion to provide an orthogonal base system. Specifically, the transmission band width of one transmission band (one band slot) is set to 150 KHz and the one transmission band of the 150 KHz includes therein 24 subcarriers. The twenty-four subcarriers are disposed continuously with an equal interval of 6.25 KHz, and every carrier is assigned with a subcarrier number from 0 to 23. However, practically existing subcarriers are allocated to bands of subcarrier numbers of 1 to 22. Bands of both end portions of the one band slot, i.e., bands of subcarrier numbers of 0 and 23 are assigned with no subcarrier, i.e., they are made to serve as a guard band and their electric power is set to zero.

One time slot is regulated at an interval of 200 $\mu$sec. in terms of the time-axis. A burst signal is modulated and transmitted together with 22 subcarriers at every time slot. One frame is defined as an array of 25 time slots (i.e., 5 msec.). Each of the time slots within one frame is assigned with a time slot number from 0 to 24. A hatched area in FIG. 6 represents a section of one time slot in one band slot. In this case, a time slot assigned with a slot number of 24 is a period in which no data is transmitted.

Multiple access in which a plurality of mobile stations (terminal apparatus) carry out communication with a base station at the same period, is carried out by using the orthogonal base system which derives from dividing the frequency-axis and time-axis in a lattice fashion. Connection condition with respective mobile stations is arranged as shown in FIGS. 7A to 7G. FIGS. 7A to 7G are diagrams each showing an operation condition indicating how six mobile stations are connected to the base station by using time slots U0, U1, U2, . . . , U5 with one band slot (actually the utilized band slot is changed due to frequency hopping which will be described later). A time slot represented by R is a reception slot while a time slot represented by T is a transmission slot. As shown in FIG. 7A, a frame timing regulated in the base station is set to a period including 24 time slots (of the 25 time slots, the last slot, i.e., a slot of number 24 is not utilized). In this case, the transmission slot is transmitted using a band different from one of the reception slot.

The mobile station U0 shown in FIG. 7B uses time slots of time slot numbers, 0, 6, 12, 18 within one frame as a reception slot, while time slots of time slot numbers, 3, 9, 15, 21 as a transmission slot. A burst signal is received or transmitted in each time slot. The mobile station U1 shown in FIG. 7C uses time slots of time slot numbers, 1, 7, 13, 19 within one frame as a reception slot, while time slots of time slot numbers, 4, 10, 16, 22 as a transmission slot. The mobile station U2 shown in FIG. 7D uses time slots of time slot numbers, 2, 8, 14, 20 within one frame as a reception slot, while time slots of time slot numbers, 5, 11, 17, 23 as a transmission slot. The mobile station U3 shown in FIG. 7E uses time slots of time slot numbers, 3, 9, 15, 21 within one frame as a reception slot, while time slots of time slot numbers, 0, 6, 12, 18 as a transmission slot. The mobile station U4 shown in FIG. 7F uses time slots of time slot numbers, 4, 10, 16, 22 within one frame as a reception slot, while time slots of time slot numbers, 1, 7, 13, 19 as a transmission slot. Further, the mobile station U5 shown in FIG. 7G uses time slots of time slot numbers, 5, 11, 17, 23 within one frame as a reception slot, while time slots of time slot numbers, 2, 8, 14, 20 as a transmission slot.

Since the arrangement shown in FIGS. 7A to 7G is employed, six time-division multiple access (TDMA) in which six mobile stations accesses one band slot is carried out. In view of each of the mobile stations, there is a spare period of two time slots (i.e., 400 $\mu$sec.) from completion of reception or transmission of one time slot period to start of next transmission or reception. Each of the mobile stations carries out a timing process and a process called a frequency hopping by utilizing this spare period. Specifically, each of the mobile stations carries out a timing processing TA for agreeing a transmission timing with a timing of a signal transmitted from a base station during after 200 $\mu$sec. have passed before each transmission slot T, and carries out the frequency hopping for switching a band slot used for transmission and reception to another band slot after about 200 $\mu$sec. have passed since completion of each transmission slot T. Since the above timing is one used when the transmission rate is set high, if the transmission rate is set low and the number of the band slot to be used is changed, then it is necessary to set the timing for the frequency hopping again.

Specifically, a plurality of band slots are allocated to a single base station. In a case of a cellular system in which one base station forms one cell, if a band of 1.2 MHz is allocated to one cell, eight band slots can be allocated to one cell. Similarly, if a band of 2.4 MHz is allocated to one cell, 16 band slots can be allocated to one cell; if a band of 4.8 MHz is allocated to one cell, 32 band slots can be allocated to one cell; and if a band of 9.6 MHz is allocated to one cell, 64 band slots can be allocated to one cell. Then, a frequency switching process called the frequency hopping is carried out so that a plurality of band slots allocated to one cell are utilized uniformly.

FIGS. 8A and 8B are diagrams showing a system in which eight band slots are provided in one cell. Specifically, in each of the prepared eight band slots as shown in FIG. 8A, twenty-two carriers are set as shown in FIG. 8B to carry out the data transmission.

The communication condition is settled as above so that a signal transmitted between each mobile station and the base station is maintained to have orthogonal property with respect to other signals. Therefore, the signal will not suffer from interference from other signals and only a corresponding signal can be extracted satisfactorily. Since a band slot utilized for transmission is changed at any time by the frequency hopping, the transmission bands prepared for each base station is effectively utilized, which leads to efficient transmission and improved resistance to a noise resulting from radio interference. In this case, as described above, a frequency band to be allocated to one base station (cell) can be freely settled. Therefore, a system can be freely settled depending on a used situation.

Next, arrangements of a base station and a terminal apparatus (mobile station or subscriber) used when communication is carried out between the base station and the terminal apparatus in the above-described system will be described. In this case, a band of 2.0 GHz is utilized as a down-link from the base station to the terminal apparatus while a band of 2.2 GHz is utilized as an up-link from the terminal apparatus to the base station.

Figure 9:
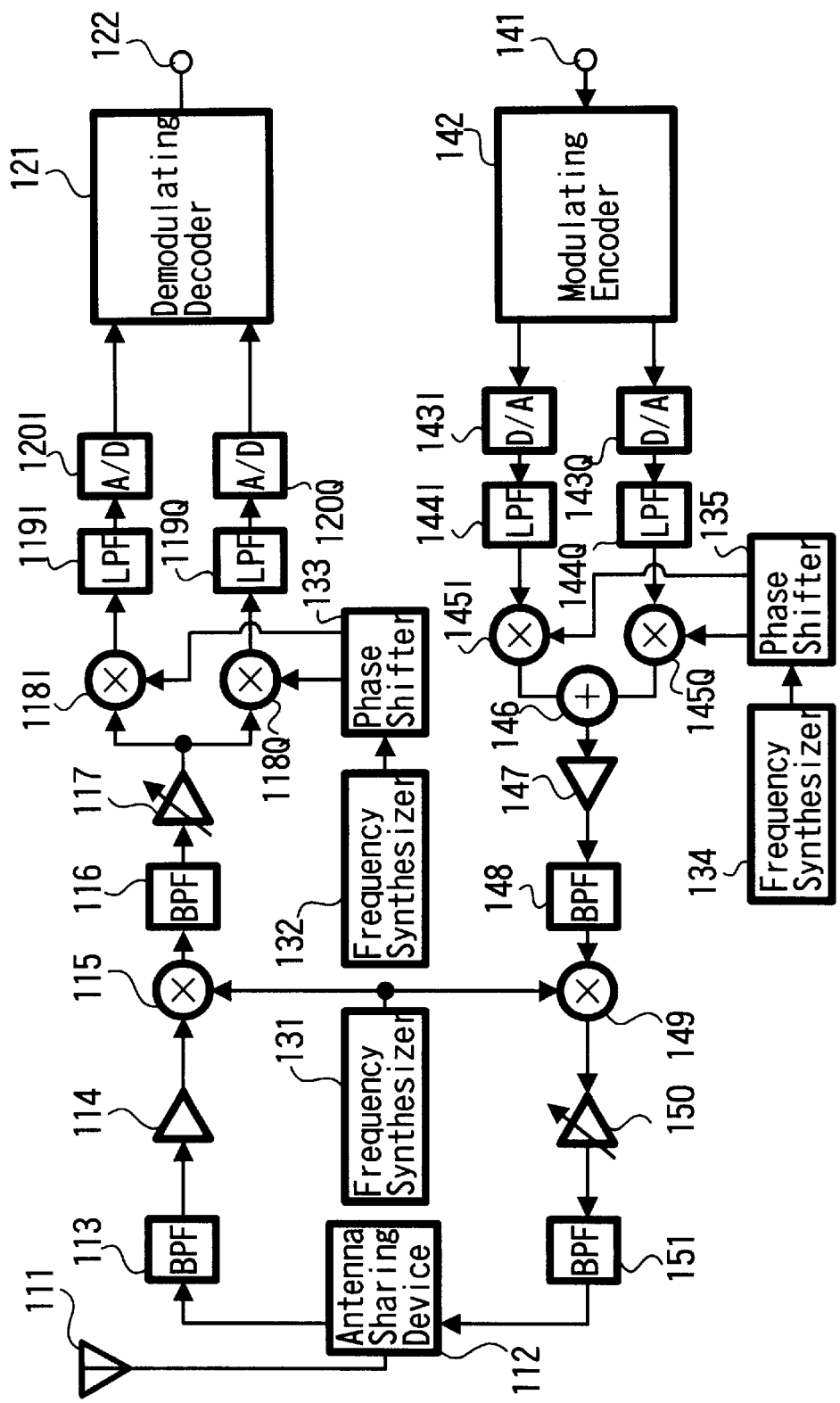
FIG. 9 is a block diagram showing an arrangement of a terminal apparatus according to the second embodiment.

FIG. 9 is a diagram showing an arrangement of the terminal apparatus. A reception system thereof will be described first. An antenna 111 serving for transmitting and receiving a signal is connected to an antenna sharing device. The antenna sharing device 112 is connected at its received signal output side with a band-pass filter 113, a reception amplifier 114 and a mixer 115 in series. The band-pass filter 113 extracts a signal of the 2.0 GHz band. The mixer 115 mixes the output from the band-pass filter with a frequency signal of 1.9 GHz output from a frequency synthesizer 131 so that the received signal is converted into an intermediate frequency signal of a 100 MHz. The frequency synthesizer 131 is formed of a PLL (phase.locked.loop circuit), and it is a synthesizer for generating signals in a band of 1.9 GHz with an interval of 150 kHz (i.e., one band slot interval).

The intermediate frequency signal output from the mixer 115 is supplied through a band-pass filter 116 and a variable gain amplifier 117 to two mixers 118I, 118Q useful for demodulation. A frequency signal of 100 MHz output from a frequency synthesizer 132 is supplied to a phase shifter 133 in which the signal is made into two system signals of which phases are shifted from each other by 90 degrees. One of the two-system frequency signals is supplied to the mixer 118I while the other of the same is supplied to the mixer 118Q so that they are mixed with the intermediate frequency signal respectively, whereby an I component and a Q component contained in the received data are extracted.

Then, the extracted I-component is supplied through a low-pass filter 119I to an analog-to-digital converter 120I in which the component is converted into digital I data. The extracted Q-component is supplied through a low-pass filter 119Q to an analog-to-digital converter 120Q in which the component is converted into digital Q data.

Then, the digital I data and digital Q data output from the analog-to-digital converters 120I, 120Q are supplied to a demodulating decoder 121 in which demodulated reception data is obtained at a terminal 122.

Next, the transmission system of the terminal apparatus will be described. Transmission data obtained at a terminal 141 is supplied to a modulating encoder 142 in which processing for encoding and modulation is carried out for transmission so as to generate digital I data and digital Q data for transmission. The digital I data and the digital Q data output from the modulating encoder 142 are supplied to digital-to-analog converters 143I and 143Q in which the data are converted into an analog I signal and an analog Q signal. The converted I signal and Q signal are supplied through low-pass filters 144I and 144Q to mixers 145I and 145Q. Further, a frequency signal of 300 MHz output from a frequency synthesizer 134 is converted by a phase shifter 135 into two system signals of which phases are shifted from each other by 90 degrees. One of the two system frequency signals is supplied to the mixer 145I while the other of the same is supplied to the mixer 145Q, whereby the frequency signals are mixed with the I signal and the Q signal, respectively, so as to form signals falling in a 300 MHz band. Both of the signals are supplied to an adder 146 in which carried out is an orthogonal modulation to unify them into a single system signal.

Then, the signal modulated into the signal of 300 MHz band output from the adder 146 is supplied through a transmission amplifier 147 and a band-pass filter 148 to a mixer 149, in which the signal is added with a frequency signal of 1.9 GHz output from the frequency synthesizer 131 so as to convert the signal into a signal of a transmission frequency of 2.2 GHz band. The transmission signal frequency-converted into the transmission frequency is supplied through a transmission amplifier (variable gain amplifier) 150 and a band-pass filter 151 to the antenna sharing device 112 so that the signal is transmitted from the antenna 111 connected to the antenna sharing device 112 in a wireless fashion. A gain of the transmission amplifier 150 is controlled to thereby adjust a transmission output. The control in transmission output is carried out based on output control data received from the base station side, for example.

Figure 10:
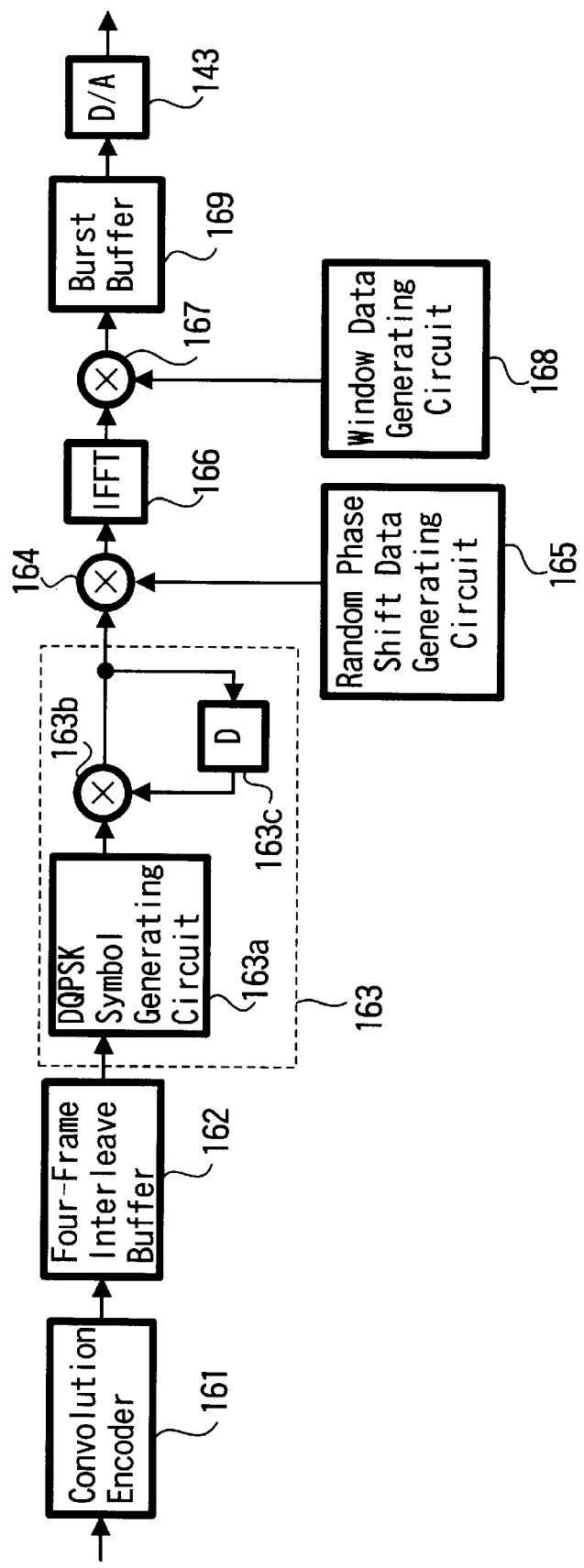
FIG. 10 is a block diagram showing an arrangement of an encoder of the terminal apparatus according to the second embodiment.

Next, the encoder in the transmission system of the terminal apparatus of the arrangement and its peripheral arrangement will be described in detail with reference to FIG. 10. A convolution encoder 161 subjects a transmission data to convolution encoding. The convolution encoding is carried out with a constrained length of k=7 and a coding rate of R=⅓, for example. An output of the convolution encoder 161 is supplied to a four-frame interleave buffer 162 in which data interleave is carried out over four frames (20 msec.). An output of the interleave buffer 162 is supplied to a DQPSK encoder 163 in which a DQPSK modulation is carried out. That is, a DQPSK symbol generating circuit 163a generates a corresponding symbol based on supplied data, and then the symbol is supplied to a multiplier 163b at one input terminal thereof. A delay circuit 163c delays a multiplied output of the multiplier 163b by one symbol amount and returns it to the other input terminal thereof, whereby the DQPSK modulation is carried out. The DQPSK modulated data is supplied to a multiplier 164 so that random phase shift data output from a random phase shift data generating circuit 165 is multiplied with the modulated data, whereby phase of the data is apparently changed at random.

An output from the multiplier 164 is supplied to an inverse fast Fourier transformation (IFFT) circuit 166 in which a conversion processing to a time axis is carried out on the data of the frequency axis by calculation of the inverse fast Fourier transformation, whereby data on the real time axis of the multicarrier signal of 22 subcarriers with an interval of 6.25 kHz is produced.

Figures 11A, 11B:
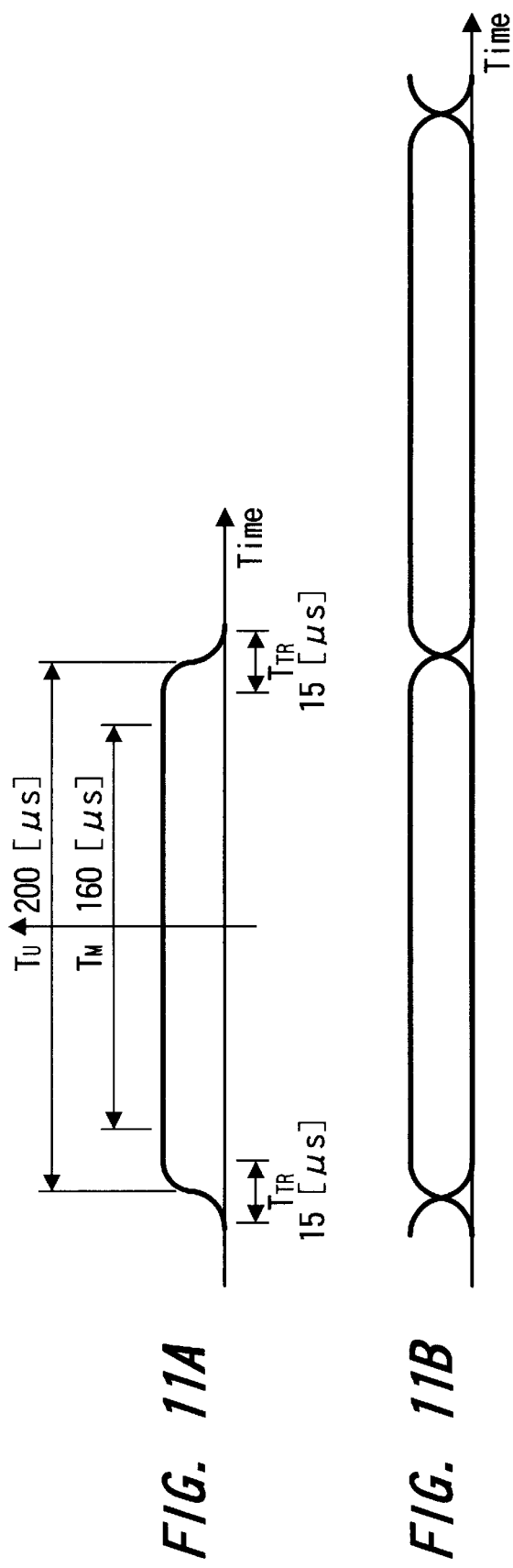
FIGS. 11A and 11B are diagrams used to explain a windowing data of the communication system according to the second embodiment.

The multicarrier data transformed into data of the real time by the inverse fast Fourier transformation is supplied to a multiplier 167 in which the data is multiplied with a time waveform output from a windowing data generating circuit 168. The time waveform is a waveform having one waveform length $T_u$, or about 200 μsec. (that is, one time slot period) as shown in FIG. 11A, for example, on the transmission side. However, the waveform is arranged to have its both end portions $T_{TR}$ (about 15 μsec.) changing gently in its waveform level. Hence, the neighboring time waveforms are arranged to overlap partly on each other as shown at FIG. 11B when the time waveform is utilized for multiplication.

The arrangement of the encoder will be described again with reference to FIG. 10. Transmission data added with the control data by the adder 167 is supplied to a digital-to-analog converter 143 (which corresponds to the digital-to-analog converters 143I, 143Q shown in FIG. 9) in which the transmission data is converted into an analog signal using a clock of 200 kHz for conversion.

Figure 12:
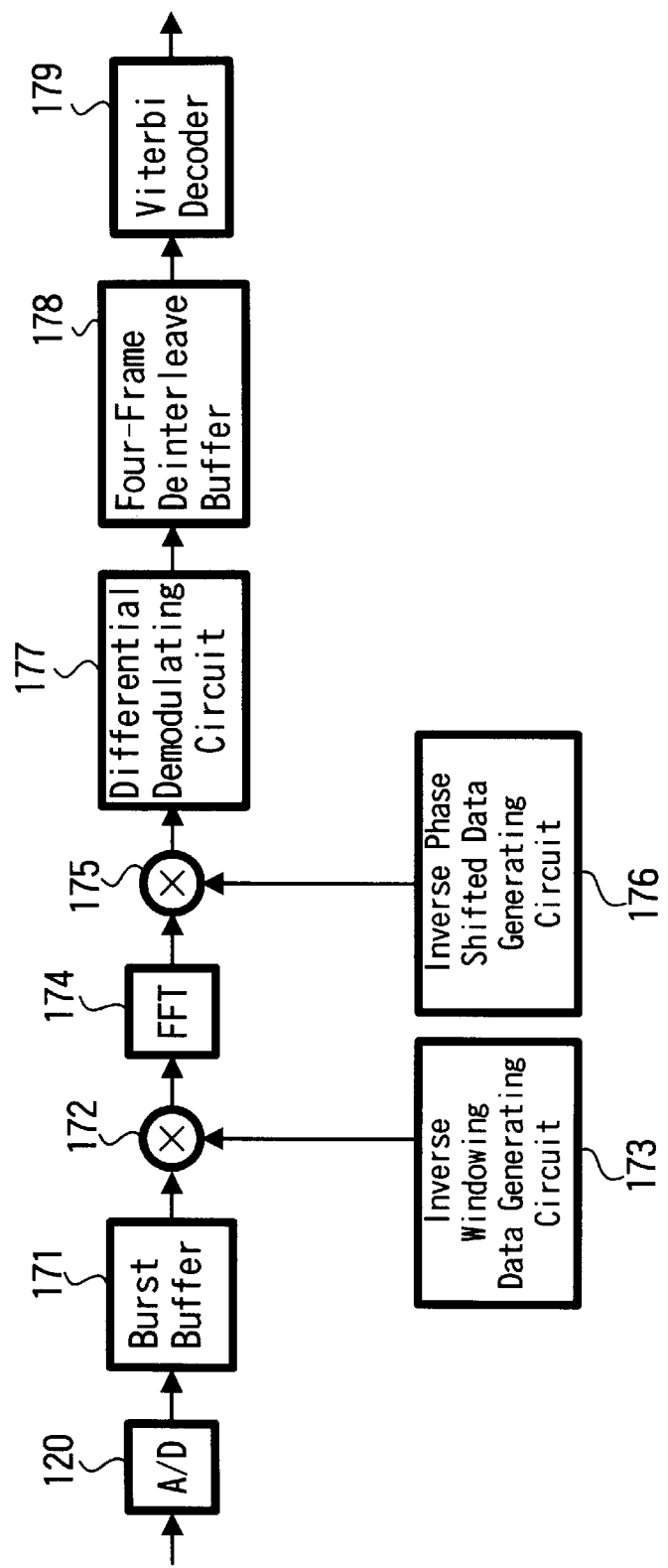
FIG. 12 is a block diagram showing an arrangement of a decoder of the terminal apparatus according to the second embodiment.

Next, the decoder and the peripheral arrangement thereof of the reception system of the terminal apparatus of the present example will be described in detail with reference to FIG. 12. Digital data resulting from conversion by an analog-to-digital converter 120 (corresponding to the analog-to-digital converters 120I, 120Q in FIG. 9) using a clock of 200 kHz, is supplied through a burst buffer 171 to a multiplier 172, in which the digital data is multiplied with a time waveform output from an inverse windowing data generating circuit 173. The time waveform utilized for multiplication upon reception is a time waveform with a shape shown in FIG. 11A. This time waveform is arranged to have a length, $T_M$, i.e., 160 μsec. which is shorter than the length of the same upon transmission.

The reception data multiplied with the time waveform is supplied to a FFT circuit 174 in which conversion between a frequency axis and a timebase is carried out by the fast Fourier transformation process, whereby the transmitted data modulated into 22 subcarriers with an interval of 6.25 kHz and arranged on the time base are separated into information component which each carrier has.

The reception data which has been subjected to the fast Fourier transformation in the FFT circuit 174 is supplied to a multiplier 175, in which the reception data is multiplied with inverse random phase shift data (this data is data changing in synchronism with random phase shift data on the transmission side) output from an inverse random phase shift data generating circuit 176, whereby the data is restored to have its original phase.

The data restored to have its original phase is supplied to a differential demodulation circuit 177 in which the data is subjected to differential demodulation. The differentially demodulated data is supplied to a four-frame deinterleave buffer 178 in which data interleaved over four frames upon transmission is restored to have its original data order. The deinterleaved data is supplied to a Viterbi decoder 179 in which the data is Viterbi-decoded. The Viterbi-decoded data is supplied as decoded reception data to a reception data processing circuit (not shown) placed in the later stage.

Figure 13:
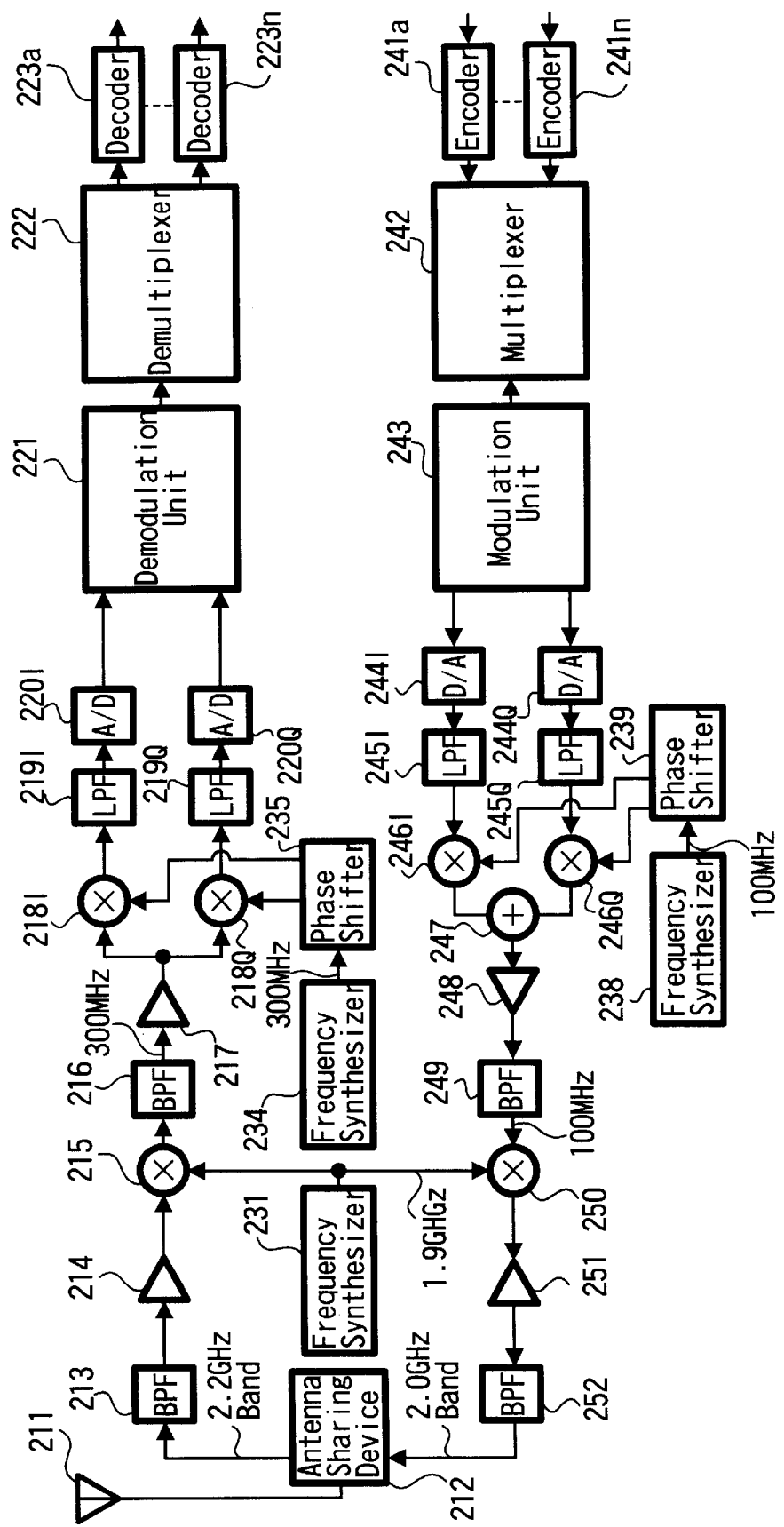
FIG. 13 is a block diagram showing an arrangement of a base station according to the second embodiment.

An arrangement of the base station will subsequently be described with reference to FIG. 13. The arrangement of the base station for transmitting and receiving data is basically the same as that of the terminal apparatus, but it is different therefrom in that it has an arrangement for carrying out the multiple access in which it is simultaneously connected to a plurality of terminal apparatus.

Initially, an arrangement of the reception system shown in FIG. 13 will be described. An antenna 211 serving for transmission and reception is connected to an antenna sharing device 212. The antenna sharing device 212 is connected at its reception signal output side with a band-pass filter 213, a reception amplifier 214 and a mixer 215 in series. The band-pass filter 213 extracts 2.2 GHz band. The mixer 215 mixes an extracted signal with a frequency signal of 1.9 GHz output from a frequency synthesizer 231 so that a reception signal is converted into an intermediate signal of 300 MHz band.

The intermediate frequency signal output from the mixer 215 is supplied through a band-pass filter 216 and a reception amplifier 217 to two mixers 218I, 218Q useful for demodulation. A frequency signal of 300 MHz output from a frequency synthesizer 234 is converted into signals of two systems of which phases are shifted from each other by 90 degrees by a phase shifter 235. One of the two system frequency signals is supplied to the mixer 218I while the other of the same is supplied to the mixer 218Q so that they are mixed with the intermediate frequency signals, respectively. Thus, an I-component and a Q-component contained in the received data are extracted.

The extracted I-component is supplied through a low-pass filter 219I to an analog-to-digital converter 220I in which the component is converted into digital I data. The extracted Q-component is supplied through a low-pass filter 219Q to an analog-to-digital converter 220Q in which the component is converted into digital Q data.

Then, the digital I data and the digital Q data output from the analog-to-digital converters 220I, 220Q are supplied to a demodulating unit 221 from which demodulated data is supplied to a demultiplexer 222, in which the data supplied thereto is classified into data from respective terminal apparatus and the classified data are supplied separately to decoders 223a, 223b, . . . , 223n of which number corresponds to a number of terminal apparatus permitted to access at a time (six terminals per one band slot).

Next, an arrangement of a transmission system of the base station will be described. A multiplexer 242 synthesizes transmission data which are separately encoded by encoders 241a, 241b, . . . , 241n prepared for respective opponents (terminal apparatus) capable of communicating at a time. An output of the multiplexer 242 is supplied to a modulation unit 243 in which modulation processing for transmission is carried out, whereby digital I data and digital Q data for transmission are generated.

The digital I data and the digital Q data output from the modulation unit 243 are supplied to digital-to-analog converters 244I and 244Q in which the digital data are converted into an analog I signal and an analog Q signal. The converted I signal and Q signal are supplied through low-pass filters 245I and 245Q to mixers 246I and 246Q. Further, a frequency signal of 100 MHz output from a frequency synthesizer 238 is converted by a phase shifter 239 into two system signals of which phases are shifted from each other by 90 degrees. One of the two system frequency signals is supplied to the mixer 246I while the other of the same is supplied to the mixer 246Q, whereby the frequency signals are mixed with the I signal and the Q signal, respectively, so as to form signals falling in a 300 MHz band. Both of the signals are supplied to an adder 247 in which carried out is an orthogonal modulation to unify them into a single system signal.

Then, the signal modulated into the signal of 100 MHz band output from the adder 247 is supplied through a transmission amplifier 248 and a band-pass filter 249 to a mixer 250, in which the signal is added with a frequency signal of 1.9 GHz band output from the frequency synthesizer 231 so as to convert the signal into a signal of a transmission frequency of 2.0 GHz band. The transmission signal frequency-converted into the transmission frequency is supplied through a transmission amplifier 251 and a band-pass filter 252 to the antenna sharing device 212 so that the signal is transmitted from the antenna 211 connected to the antenna sharing device 212 in a wireless fashion.

Figure 14:
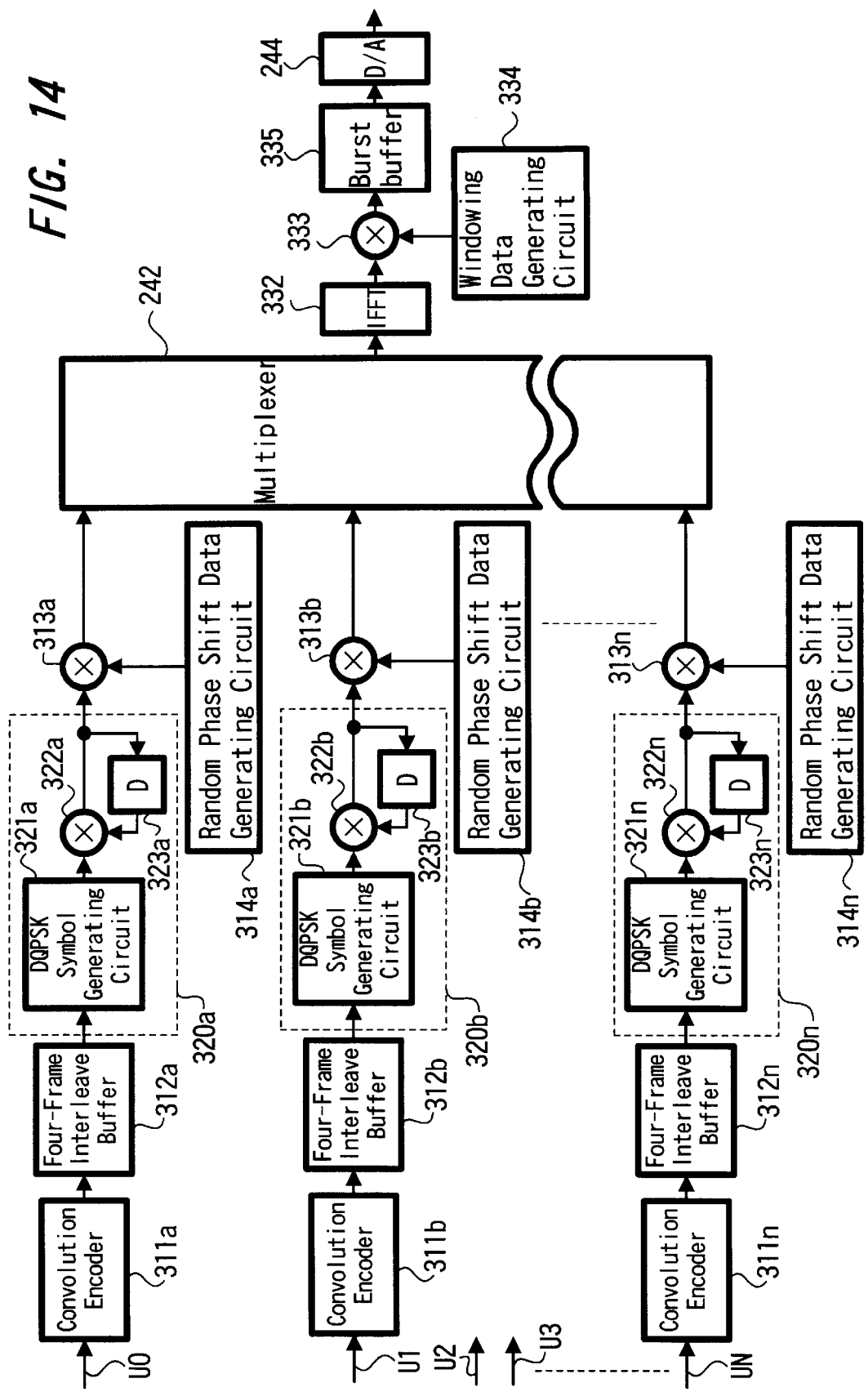
FIG. 14 is a block diagram showing an arrangement of a modulation processing unit of the base station according to the second embodiment.

Next, an arrangement of the base station for encoding and modulating transmission data will be described in detail with reference to FIG. 14. In this case, it is supposed that N (N is an arbitrary number) terminal apparatus (users) carry out multiple access at a time. Thus, convolution encoders 311a, 311b, . . . , 311n subjects transmission signals U0, U1, . . . , UN to respective users of the terminal apparatus to convolution encoding, respectively. The convolution encoding is carried out with a constraint length k=7 and a coding rate R=⅓, for example.

Then, data convolution-encoded by respective systems are supplied to four-frame interleave buffers 312a, 312b, . . . , 312n, respectively, in each of which interleave is carried out on data over four frames (20 msec.). Outputs of respective interleave buffers 312a, 312b, . . . , 312n are supplied to DQPSK encoders 320a, 320b, . . . , 320n, respectively, in each of which DQPSK modulation is carried out. Specifically, DQPSK symbol generating circuits 321a, 321b, . . . , 321n generate corresponding symbols based on the supplied data. The symbols are supplied to one input of multipliers 322a, 322b, . . . , 322n, and multiplied outputs of the multipliers 322a, 322b, . . . , 322n are supplied to respective delay circuits 323a, 323b, . . . , 323n in each of which the symbol is delayed by one symbol amount and fed back to the other input. Thus, DQPSK modulation is carried out. Then, the data subjected to the DQPSK modulation are supplied to the multipliers 313a, 313b, . . . , 313n, respectively, in which random phase shift data separately output from random phase shift data generating circuit 314a, 314b, . . . , 314n are multiplied with modulation data. Thus, respective data are changed in phase at random apparently.

Outputs of the respective multipliers 313a, 313b, . . . , 313n are supplied to a multiplexer 242 and then synthesized thereby. When the transmission data are synthesized by the multiplexer 242 according to this embodiment, a frequency at which the transmission data are synthesized can be switched by a unit of 150 kHz. By the switching control, the frequency of the burst signal supplied to each terminal apparatus is switched. Specifically, in this embodiment, as described with reference to FIGS. 7A to 7G and so on, an operation of switching a frequency by a band slot unit which is called a frequency hopping is carried out, and the frequency switching operation is realized by switching processings of the multiplexer 242 upon the synthesizing operation.

The data synthesized by the multiplexer 242 is supplied to an IFFT circuit 332 which carries out the inverse fast Fourier transform for the data, and then obtains a so-called multicarrier data modulated so as to have twenty two subcarriers having frequencies at every 6.25 kHz per one band slot and converted into the real time. Then, the data converted into the real time signal by the inverse fast Fourier transform is supplied to a multiplier 333 which multiplies it with a time waveform output from a windowing data generating circuit 334. As shown in FIG. 11A, for example, the time wave form is a waveform whose length $T_u$ of one waveform is about 200 μsecond (i.e., one time slot period). However, at each of its both end portions $T_{TR}$ thereof (about 15 μsecond), a level of the waveform is smoothly changed. When the waveform is multiplied with the time wave form as shown in FIG. 11B, adjacent time waveforms are partially overlapped with each other.

Then, the signal multiplied with the time waveform by the multiplier 333 is supplied through a burst buffer 335 to a digital/analog converter 244 (corresponding to the converters 244I, 244Q shown in FIG. 13) which converts it into an analog I signal and an analog Q signal. Then, the analog signals are processed for transmission in the arrangement shown in FIG. 15.

Figure 15:
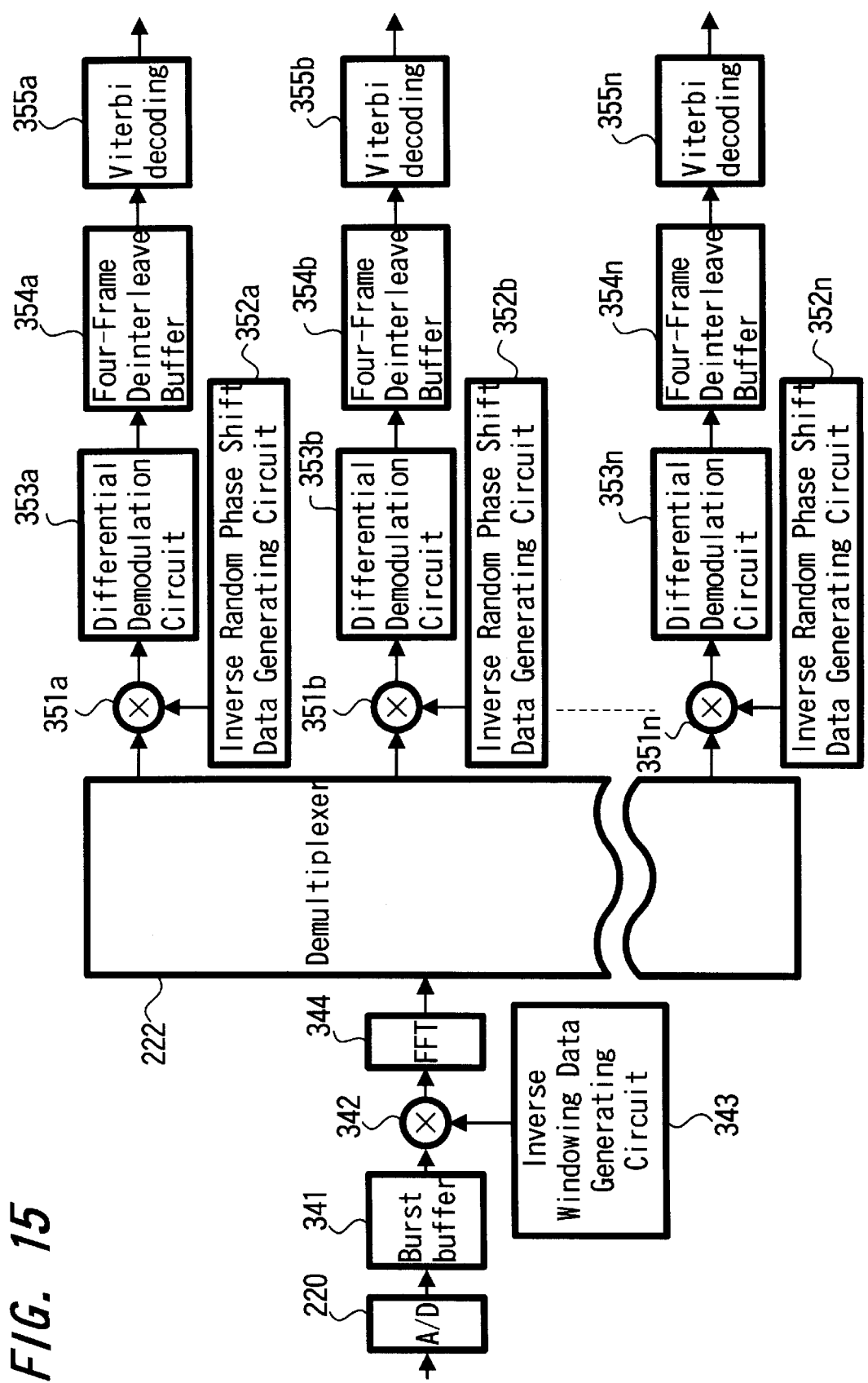
FIG. 15 is a block diagram showing an arrangement of a demodulation processing unit of the base station according to the second embodiment.

An arrangement for demodulating received data in the base station to decode it will be described in detail with reference to FIG. 15. Digital I data and digital Q data converted by an analog/digital converter 220 (corresponding to the analog/digital converters 220I and 220Q in FIG. 13) are supplied through a burst buffer 341 to a multiplier 342. The multiplier output multiplies them with a time waveform output from an inverse windowing data generating circuit 343. The time waveform is a time waveform having a shape shown in FIGS. 11A and 11B and also a time waveform having a length $T_M$ of 160 μsec which is shorter than that used upon transmission.

The received data multiplied with the time waveform is supplied to a FFT circuit 344 and subjected to fast Fourier transform thereby to carry out a processing converting a frequency axis into a time axis. Thus, each of the data transmitted after modulation in the form of 22 subcarriers at an interval of 6.25 kHz per one band slot is obtained from the real time signal. Then, the data subjected to the fast Fourier transform is supplied to a demultiplexer 222 and divided into data which is as much as the terminal apparatus permitted in multiple access to the base station simultaneously. When the data is divided by the demultiplexer 222 according to this embodiment, the frequency used for the above division is switch ed by a unit of 150 kHz and this switching operation is controlled thereby frequencies of the burst signals transmitted from the respective terminal apparatus being switched. Specifically, in this embodiment, as described with reference to FIGS. 7A to 7G and so on, the operation of switching the frequency of a band slot unit which is called the frequency hopping is carried out periodically, and the frequency switching operation carried out on the reception side is realized by time-dividing processings of the demultiplexer 222 upon reception of the received data.

The respective received data divided by the demultiplexer 222 are independently supplied to multiplexers 351a, 351b, . . . , 351n provided so as to be as much as the terminal apparatus of the number N permitted in simultaneous multiple access to the base station. The multipliers 351a, 351b, . . . , 351n respectively multiply the divided data with inverse random phase shift data (data changed in synchronization with the random phase shift data on the transmission side) output from the inverse random phase shift data generating circuits 352a, 352b, . . . , 352n and returns the received divided data to the data having the original phases in the respective systems.

The respective data from the inverse random phase shift data generating circuits are supplied to delay detection circuits 353a, 353b, . . . , 353n and delay-detected (differentially demodulated) thereby. The delay detection circuits supplies the delay detected data to four-frame interleave buffers 354a, 354b, . . . , 354n which restores the data of four frames interleaved upon transmission to the data of the original data arrangement. The four-frame interleave buffers supply the de-interleaved data to Viterbi decoders 355a, 355b, . . . , 355n for subjecting them to Viterbi decoding. The decoders supply the data subjected to the Viterbi decoding as the received data to received-data processing circuits (not shown) at the succeeding stages.

In the above communication processings, the convolutional encoding and the Viterbi decoding are applied to the encoding and decoding processings, respectively. These encoding and decoding processings have been described by way of example. Therefore, the present invention is not limited to these encoding and decoding systems. An encoding processing for processing for setting a larger distance between transmission symbol series may be employed, and a decoding processing for carrying out a most likelihood series estimation based on a reception symbol may be employed. Specifically, a known turbo code and so on can also be employed.

A communication state presented when the communication between the terminal apparatus and the base station described above is carried out will be described. In this embodiment, the transmission capacity used when the communication is carried out between the terminal apparatus and the base station can be adaptively set and a system for transmitting the multicarrier signal is applied to the processing for adaptively setting the transmission capacity.

Figure 16A:
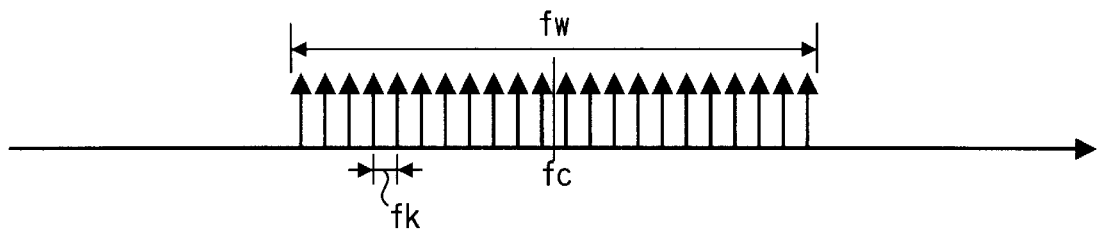
FIGS. 16A and 16B are diagrams used to explain a transmission state according to the second embodiment.

In this embodiment, as described above with reference to FIG. 6 and so on, the communication circuit usually set between the terminal apparatus and the base station is set by providing twenty-two subcarriers in one slot at a constant frequency interval, and a communication circuit of one unit is set by using one band slot, wherein the audio data and so on are transmitted. FIG. 16A shows a state of transmitting the twenty-two subcarriers by using a band fw of one band slot, in which fc and fk respectively depict a center frequency and a frequency interval between adjacent subcarriers (an interval of 6.25 kHz).

Figure 16B:
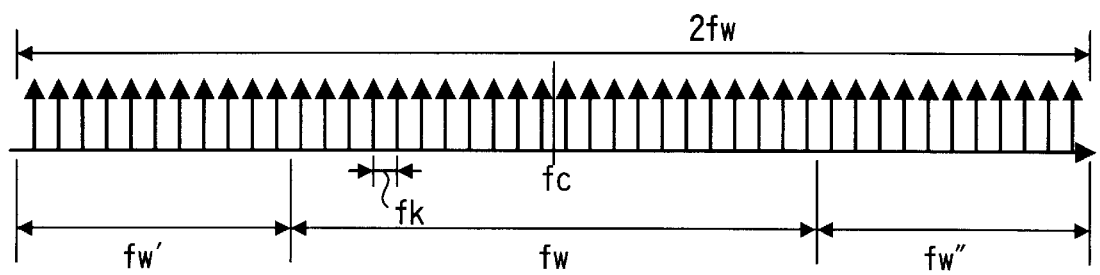

It is assumed that a request to increase a transmission capacity of information to be transmitted (i.e., a request to increase a transmission speed) is issued in a state that the communication circuit is set. At this time, if an adjacent band slot is a free slot, then the free band slot is added and allocated to the communication circuit, thereby, as shown in FIG. 16B, forty-four subcarriers being transmitted by using a band 2fw of two band slots. The frequency interval fk between adjacent subcarriers is the same as that presented upon use of one slot. A center frequency fc presented upon use of two band slots may be set the same as a frequency presented upon use of one band slot or may be changed in response to a band of two band slots.

When the band of two slots is used as described above, as shown in FIG. 16B, data transmitted by twenty-two subcarriers in a band fw at the center portion around the center frequency fc are set as the data of the channel 1, and data transmitted by twenty-two subcarriers in bands fw' and fw" located on the upper and lower side of the band fw are set as the data of the channel 2. In the connection sequence processing shown in FIG. 5 (described in the first embodiment), while the data is transmitted, the processing for adding the channel 2 (the bands fw' and fw") is carried out.

Specifically, this processing will be described with reference to FIG. 5 again. Communication on the channel 1 (CH1) is a continuous communication (communication shown by a solid line in FIG. 5) using the subcarriers in the band fw, the communication on the channel 2 (CH2) is a newly added communication using the bands fw' and fw". It is assumed that while the communication on the channel 1 is being carried out, increase of the transmission capacity is demanded because the terminal apparatus starts transmitting a new information. At this time, the terminal apparatus transmits the request signal S101 for requesting the base station to create the new information channel to the base station by using a predetermined period in the channel 1 of the up-link circuit which is being used for communication.

When receiving the request signal S101 for requesting generation of the new information channel, the base station detects a free band slot and transmits a signal indicative of acceptance of opening a new channel in the free band slot and a signal S102 indicative of parameters changed in accordance with the acceptance. When receiving and confirming the signal indicative of the acceptance and so on, the terminal apparatus transmits an acknowledge (ACK) signal S103 by using the time slot T1 of the up-link circuit.

The parameters transmitted from the base station includes not only data about a band allocated as a new channel but also data of a timing at which communication is started in the band. In this case, at the timing indicated by the data, the communication is changed to a communication using two continuous band slots.

At the timing indicated by the data, the base station starts transmitting a header information signal by using the newly allocated bands fw' and fw" of the down-link circuit, and the terminal apparatus starts transmitting a header information signal by using the newly allocated bands fw' and fw" of the up-link circuit (these processings are indicated by reference number S104 in FIG. 5). The information such as the audio data or the like is continuously transmitted by using the band fw in each of frames. The header information signal is a predetermined signal formed of data having a specific pattern.

When the bidirectional transmission S104 of the header information signal by using the newly allocated bands fw' and fw" is started, a reception-side control unit determines whether or not the header information signal can be correctly received. If it is determined that the header information signal is received correctly, the reception-side control unit transmits an acknowledge signal S105 to the transmission side by using a predetermined period. When both sides receives and discriminates the acknowledge signals S105, the transmission of the information by using the newly allocated channel 2, and a communication circuit between the base station and one terminal apparatus is set. When information is transmitted by using the channels T1 and T2, information of the same kind may be transmitted by being divided into two for the two time slots T1 and T2 or informations of different kinds (e.g., an audio data and an electronic mail data) may be transmitted by using the two channels 1 and 2, respectively.

The process of changing a transmission capacity to the original transmission capacity (a processing of reducing a transmission capacity when a transmission circuit using two channels is initially set) will be described. When the transmission capacity is reduced in accordance with the request from the terminal apparatus, as shown in FIG. 5, the terminal apparatus transmits a request signal S106 used for requesting the base station to open the channel 2 to the base station by using the channel 2 in the up-link circuit. When the base station receives the opening request signal S106 and its control unit confirms it, the base station transmits an acknowledge signal and a signal S107 indicative of parameters to be changed to the terminal apparatus by using the time slot T2 of the down-link circuit. After transmitting the signal S107 indicative of the parameters to be changed, the base station transmits a signal S108 for designating the number of a slot to be freed to the terminal apparatus as a trailer information signal used for freeing the circuit by using the channel 2 of the down-link circuit. When the terminal apparatus receives the signal S108 and its control unit confirms it, the terminal apparatus transmits an acknowledge signal (ACK signal) S109 to the base station by using the channel 2 of the up-link circuit and terminates the communication using the channel 2, thereby freeing the communication circuit using the channel 2. Thereafter, only the communication circuit using the channel 1 is still carried out, and hence the communication circuit is set in a state shown in FIG. 16A. Thereafter, when the communication using only the channel 1 is carried out after the channel 2 is freed, the center frequency fc may be changed.

While in this embodiment the numbers of subcarriers transmitted on the channels 1 and 2 are set the same to thereby set the capacities of information which can be transmitted on the channels 1 and 2, the capacities of information which can be transmitted on each of channels may be changed by changing the number of subcarriers on the channels 1 and 2.

While in this embodiment both of the numbers of the bands of the up-link and down-link circuits are increased or decreased, the number of the band slots of only either of circuits may be changed.

Figure 17A:
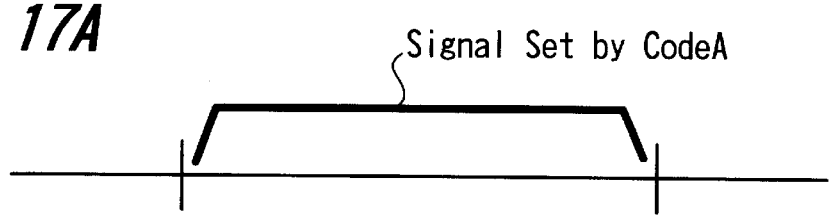
FIGS. 17A and 17B are diagrams used to explain an arrangement of a signal according to a CDMA system.
Figure 17B:
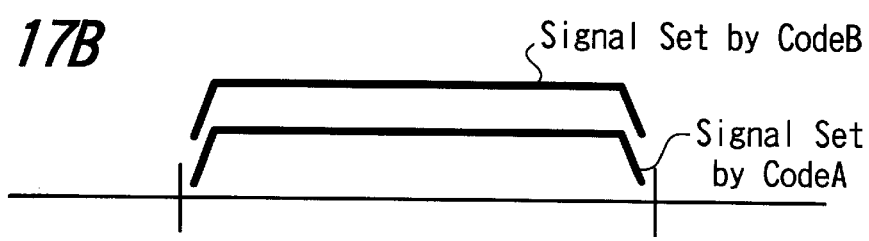

While in the above embodiment the facsimile video data and the electronic mail data are transmitted as the data other than the audio data, the present invention is not limited thereto and the processings according to the embodiments can be applied to transmission of data of other kinds. They can also be applied to the processing for simultaneously setting a plurality of logical transmission channels in a communication to which other systems than the TDMA system and the multicarrier system are applied. In case of the CDMA system, for example, if data to be transmitted is dispersed by using a plurality of diffusion codes and transmitted by setting a plurality of logical transmission channels at the same time, then the transmission capacity can be increased. FIGS. 17A and 17B are diagrams showing a state of the above processing.

According to the communication method of the present invention and the base station or the terminal apparatus to which the communication method is applied, since, when the request to increase or decrease the transmission capacity of the data transmitted through the communication circuit is issued, the number of time slots in one unit time used in the communication circuit is increased or decreased, it is possible to set the communication circuit having a proper transmission capacity in response to information to be transmitted at that time. Moreover, it is possible to effectively utilize the transmission band allocated to the base station.

In this case, since the frequency of the transmission channel set as the communication circuit is changed at every constant interval, the signal is transmitted by being spread in the transmission band prepared for each of the base stations, which leads to more effective use of the transmission band.

When the number of the time slots in one unit time is increased, after the number of time slots is increased, use of the time slot in one unit time used before the increase of the time slots is stopped. Therefore, it is possible to properly use the time slots by changing the transmission capacity with respect to the respective time slots.

When the number of the time slots in one unit time is increased or decreased, only the number of time slots in one unit time used by either of the up-link circuit from the terminal apparatus to the base station and the down-link circuit from the base station to the terminal apparatus is increased or decreased. Therefore, it is possible to set the proper number of time slots corresponding to an amount of information to be transmitted in each of the up-link circuit and the down-link circuit, which leads to more effective use of the transmission band.

According to the communication method of the present invention and the base station or the terminal apparatus to which the communication method is applied, since, when the request to increase or decrease the transmission capacity of the data transmitted through the communication circuit is issued, the number of subcarrier signals used in the communication circuit is increased or decreased, it is possible to set the communication circuit having a proper transmission capacity in response to information to be transmitted at that time. Moreover, it is possible to effectively utilize the transmission band allocated to the base station.

In this case, since the frequency of the transmission channel set as the communication circuit is changed at every constant interval, the signal is transmitted by being spread in the transmission band prepared for each of the base stations, which leads to more effective use of the transmission band.

When the number of subcarrier signals is increased, if the number of subcarrier signals to be transmitted is increased, the sampling frequency of the reception signal is set higher in response to the increase, and the number of conversion points used for converting received data dispersed in a plurality of subcarrier signals into a time series data is changed in response to the increase. Therefore, it is possible to easily cope with the change of the number of subcarrier signals.

When the sampling frequency and the number of conversion points are changed, a response signal is returned after reception of the transmitted header information signal, and then the increased subcarrier signal is used as the information transmission period. It is possible to properly change the processing in response to the increase of the subcarrier signals.

When the number of subcarrier signals is decreased, if the number of subcarrier signals to be transmitted is increased, the sampling frequency of the reception signal is set higher in response to the decrease, and the number of conversion points used for converting received data dispersed in a plurality of subcarrier signals into a time series data is changed in response to the decrease. Therefore, it is possible to easily cope with the change of the number of subcarrier signals.

When the sampling frequency and the number of conversion points are changed, a response signal is returned after reception of the transmitted trailer information signal, and then the decreased subcarrier signal is used as the information transmission period. It is possible to properly change the processing in response to the decrease of the subcarrier signals.

When the number of the subcarrier signals is increased or decreased, only the number of subcarrier signals used by either of the up-link circuit from the terminal apparatus to the base station and the down-link circuit from the base station to the terminal apparatus is increased or decreased. Therefore, it is possible to set the proper number of subcarrier signals corresponding to an amount of information to be transmitted in each of the up-link circuit and the down-link circuit, which leads to more effective use of the transmission band.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A communication resource allocation method in which a second apparatus allocates a communication resource based on a request from a first apparatus, comprising the steps of:

transmitting an allocation request signal for increasing or decreasing a transmission capacity by said first apparatus to said second apparatus; and detecting, by said second apparatus, said allocation request signal to allocate said communication resource, wherein said communication resource allocation is carried out by a process of increasing or decreasing resources by a predetermined amount, said communication resource forms a part of a Time Division Multiple Access (TDMA) communication network and said predetermined amount is one time slot or more than one time slot, and said first and second apparatus communicate using said adjusted transmission capacity.

2. A communication resource allocation method according to claim 1, wherein said communication resource allocation is carried out for transmission from said first apparatus to said second apparatus and/or transmission from said second apparatus to said first apparatus.

3. A communication resource allocation method in which a second apparatus allocates a communication resource based on a request from a first apparatus, comprising the steps of:
   transmitting an allocation request signal for increasing or decreasing a transmission capacity by said first apparatus to said second apparatus; and
   detecting, by said second apparatus, said allocation request signal to allocate said communication resource, wherein said communication resource allocation is carried out by a process of increasing or decreasing resources of a predetermined amount, said communication resource forms a part of a multicarrier communication network and said predetermined amount is one group formed of a plurality of subcarriers, and said first and second apparatus communicate using said adjusted transmission capacity.

4. The communication resource allocation method according to claims 1 or 3, wherein said communication resource allocation includes an operation for changing a center frequency for allocation randomly at every predetermined time.

5. A communication resource allocation method in which a second apparatus allocates a communication resource based on a request from a first apparatus, comprising the steps of:
   transmitting an allocation request signal by said first apparatus to said second apparatus, said allocation request signal requesting an increased or decreased transmission capacity;
   detecting said allocation request signal by said second apparatus to transmit a related information to said first apparatus therefrom;
   receiving said related information by said second apparatus to transmit an acknowledge signal therefrom for confirmation; and
   carrying out a communication by said first and second apparatus based on a communication resource allocation made by employing a resource of a predetermined amount included in said related information as a unit.

6. The communication resource allocation method according to claim 5, wherein said communication resource forms a part of a Time Division Multiple Access (TDMA) communication network and said predetermined amount is one time slot or more than one time slot.

7. The communication resource allocation method according to claim 5, wherein said communication resource forms a part of a multicarrier communication network and said predetermined amount is one group formed of a plurality of subcarriers.

8. The communication resource allocation method according to claim 5, wherein said communication resource forms a part of a Code Division Multiple Access (CDMA) communication network and said predetermined amount is one spread code or more than one spread code.

9. The communication resource allocation method according to claims 5, 6, 7, or 8, wherein said communication resource allocation includes an operation for changing a center frequently for allocation randomly at every predetermined time.

10. A base station for allocating a communication resource based on a request from a terminal, comprising:
   a reception unit for receiving an allocation request signal from said terminal, said allocation request signal requesting an increased or decreased transmission capacity;
   a control unit for grasping a condition of a communication resource and for carrying out a communication resource allocation at a unit of a resource of a predetermined amount in response to said allocation request signal and
   a transmission unit for transmitting a result of said communication resource allocation by said control unit.

11. The base station according to claim 10, wherein said communication resource forms a part of a Time Division Multiple Access (TDMA) communication network and said predetermined amount is one time slot or more than one time slot.

12. The base station according to claim 10, wherein said communication resource forms a part of a multicarrier information network and said predetermined amount is one group formed of a plurality of subcarriers.

13. The base station according to claim 10, wherein said communication resource forms a part of a Code Division Multiple Accesd (CDMA) communication network and said predetermined amount is one spread code or more than one spread code.

14. The base station according to claims 10, 11, 12 or 13, wherein said communication resource allocation includes an operation for changing a center frequency for allocation randomly at every predetermined time.

15. The base station according to claim 10, wherein said communication resource allocation is a process for allocating another resource other than a resource which has already been used to thereafter reduce resources of a predetermined amount unit.

16. The base station according to claim 10, wherein said communication resource allocation is carried out for transmission from said first second apparatus and/or transmission from said second apparatus to said first apparatus.

17. A terminal apparatus, comprising:
   a control unit for generating an allocation request signal, said allocation request signal requesting an increased or decreased transmission capacity;
   a transmission unit for transmitting said allocation request signal generated by said control unit; and
   a reception unit for receiving a result of a communication resource allocation carried out by a base station, wherein said control unit control communication resource allocation and said communication resource allocation is carried out by using a resource of a predetermined amount as a unit.

18. The terminal apparatus according to claim 17, wherein said communication resource allocation is a process for allocating another resource other than a resource which has already been used.

19. The terminal apparatus according to claim 17, wherein said communication resource form a part of a Time Division Multiple Access (TDMA) communication network and said predetermined amount is one time slot or more than one time slot.

20. The terminal apparatus according to claim 17, wherein said communication resource forms a part of a multicarrier communication network and said predetermined amount is one group formed of a plurality of subcarriers.

21. The terminal apparatus according to claim 17, wherein said communication resource forms a part of a Code Division Multiple Access (CDMA) communication network and said predetermined amount is one spread code or more than one spread code.

22. The terminal apparatus according to claims 17, 19, 20, or 21, wherein said communication resource allocation includes an operation for changing a center frequency for allocation randomly at every predetermined time.

* * * * *